(12) United States Patent
Palareddy et al.

(10) Patent No.: US 10,108,375 B2
(45) Date of Patent: Oct. 23, 2018

(54) SYSTEMS AND/OR METHODS FOR UNIFIED HANDLING OF EVENT NOTIFICATIONS ACROSS DIFFERENT MODEL TYPES

(71) Applicant: Software AG, Darmstadt (DE)

(72) Inventors: Satish Kumar Reddy Palareddy, Bangalore (IN); Devashish Karecha, Bangalore (IN)

(73) Assignee: SOFTWARE AG, Darmstadt (DE)

( * ) Notice: Subject to any disclaimer, the term of this patent is extended or adjusted under 35 U.S.C. 154(b) by 191 days.

(21) Appl. No.: 15/298,833

(22) Filed: Oct. 20, 2016

(65) Prior Publication Data
US 2018/0113647 A1    Apr. 26, 2018

(51) Int. Cl.
*G06F 3/06* (2006.01)

(52) U.S. Cl.
CPC .......... *G06F 3/0659* (2013.01); *G06F 3/0604* (2013.01); *G06F 3/0688* (2013.01)

(58) Field of Classification Search
CPC ..... G06F 3/0659; G06F 3/0604; G06F 3/0688
See application file for complete search history.

(56) References Cited

U.S. PATENT DOCUMENTS 5,991,536 A * 11/1999 Brodsky .................. G06F 8/71
717/104
9,824,075 B1 * 11/2017 Gross .................. G06F 17/2247

OTHER PUBLICATIONS

A. Kumar, S. Kasabov, "Observer Architecture of Program Visualization", Electronic Notes in Theoretical Computer Science, vol. 178, pp. 153-160, 2007. (Year: 2007).*

* cited by examiner

*Primary Examiner* — Ramon A. Mercado
(74) *Attorney, Agent, or Firm* — Nixon & Vanderhye P.C.

(57) ABSTRACT

A computer system is provided that stores files in a structured file format and stores configuration files that indicate programmatic definitions for handlers. A processing system generates in-memory models of the structured files and creates a list of observer objects and observable objects. A handler is generated for each observer and observable object. The handlers handle how changes are to be updated and/or propagated to other files. When a data value of one of the files is to be updated and the data value is associated with an observable element of that file, the handler for the corresponding observable object is triggered. A handler for an observer object will also be triggered that shares the topic of the attribute being observed. Once the in-memory representation of the models are updated, the models are persisted back to non-volatile storage (as files) where the changes are reflected.

20 Claims, 17 Drawing Sheets

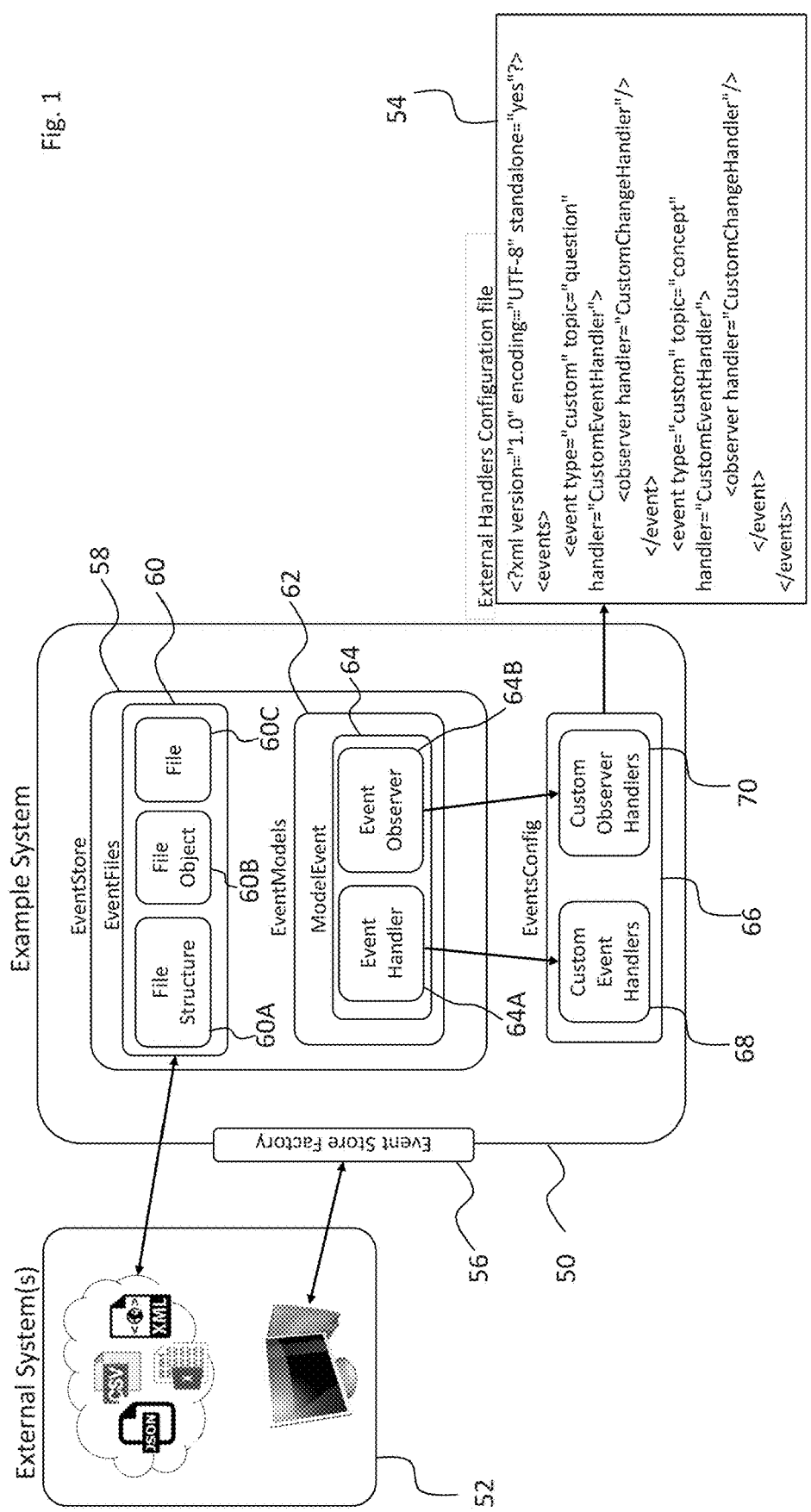

SYSTEMS AND/OR METHODS FOR UNIFIED HANDLING OF EVENT NOTIFICATIONS ACROSS DIFFERENT MODEL TYPES

TECHNICAL FIELD

Certain example embodiments described herein relate to techniques for detecting and handling changes to models of files that are stored in memory of a computer system. More particularly, certain example embodiments described herein relate to systems and/or methods that use callbacks and custom event handlers to detect to changes an in-memory model and handle changes across multiple different types of models.

BACKGROUND AND SUMMARY

Companies and other organizations sometimes use structured document formats to storage large amounts of information. Structured document formats can include open (or semi-open) formats like XML (extensible markup language), JSON (JavaScript Object Notation), and comma separate values (CSV) and proprietary formats like Microsoft Excel. The types of information and the format used by organizations can vary widely—sometimes even within an individual organization. For example, an XML file may hold a list of employees for an organization, a JSON file may hold a list of employee reviews, an Excel file may hold a list of the projects that are being implemented and those that are planned (along with the team members for each project), a CSV file may hold the names of employees that are attending the companies summer party, etc. . . . . . Further numbers of files (e.g., tens or even hundreds of other files) may also hold additional (and sometimes duplicative data).

In such an environment it will be appreciated that the overall complexity of how the data is stored may be very complex—so complex that changes to one file may cause a cascade of problems for other files. This complexity can further increase (e.g., exponentially) as the number of changes and/or the number of elements that are affected by a given change also increases. When these files are stored in-memory (e.g., RAM) of a computer system a model of the file and/or the data that is represented in that file may be created. For example, when an XML file is loaded a document object model (DOM) may be created and stored in RAM. The DOM presents the XML file as a tree structure that can be programmatically manipulated.

As downside of current techniques for handling structure document formats like XML and JSON is that there is limited ability to handle changes to the in-memory model representation. For example, existing XML parsing techniques that rely on the document object model (DOM) or Simple API for XML (SAX) do not provide out of the box functionality for registering events with callbacks. Instead, these techniques are mainly used for parsing the XML model, but lack support for custom event handling.

While SAX does include events like: NotIdentifiableEvent, ParseConversionEvent, PrintConversionEvent, ValidationEvent, they are of limited help in handling changes throughout a model. A SAX parser can be used to parse a model represented in XML and existing functions like startElement( ) or stopElement( ) can be overridden in the default Handlers. But with this approach, it is still not possible to perform bulk and/or lazy custom event handling on the XML model. Instead, the SAX parser determines when to register and perform an event. Accordingly, a process can only perform actions while a model is being parsed—not when a change is made to an element in the model. This approach means that there is no functionality for parsing the XML model for change events or functionality for performing even callbacks to interested observers.

For JSON based models, existing parsing techniques like Jackson or GSON may only allow Object mappers which convert the JSON files to and from Java objects, but these are only useful for parsing the JSON files and there is no OOTB functionality supports event handling for the JSON-based models.

Certain example embodiments address the above and/or other concerns. For example, certain example embodiments provide for a unified handling of model changes in bulk. In certain examples, callbacks are provided to handle the impact of changes that may occur across different elements of a model (or multiple different models). In certain instances, a callback for an event may be handled by a custom Observer handlers. In certain examples, the process described herein may call an Observer handler once an event is triggered. Certain techniques described herein may provide flexible event handling (e.g., via custom handlers), scalable event handling (e.g., so that changes may be handled across a model or different models), and/or a declarative approach for event handling. The techniques herein may be used to handle changes to models that are persisted in different formats such as, for example, XML, JSON, and the like.

In certain example embodiments, a computer system comprising a non-volatile storage system and a processing system that includes at least one hardware processor that is coupled to electronic memory is provided. The non-volatile storage system is configured to store at least one file that includes data elements in a structured file format and at least one configuration file that includes programmatic definitions for observer and/or observable handlers. The processing system is configured to (e.g., programmed to via computer executable code) generate at least one in-memory model of the at least one file by loading the at least one file stored in the non-volatile storage system to the electronic memory that is coupled to the at least one hardware processor and create at least one list of observer objects by determining, from among the data elements of the at least one in-memory model, that at least one of the data elements, or a property thereof, is annotated as an observer. The processing system is further configured to create at least one list of observable objects by determining, from among the data elements of the at least one in-memory model, that at least one of the data elements, or a property thereof, is annotated as observable, where each one of the observable elements shares an attribute with at least one of the observer elements. For each one of the created observer and observable objects, the processing system generates a handler object and links the handler object to the corresponding created observer or observable object. A determination is made that a data value of a first observable element of the at least one in-memory model is to be updated and responsive to this determination the customer handlers are invoked. Specifically, the processing system is configured to invoke a first generated handler for the first observable object and invoke a second generated handler for an observer object that shares the same attribute with the first observable object, where the first and second generated handlers cause an update to a data value in the at least one in-memory model. Upon determination that the data value has been successfully updated, the in-memory model that was updated is then persisted to a file on the non-volatile storage medium.

In certain example embodiments, the at least one file includes a plurality of files (e.g., such that multiple files are processed), where multiple different structured file formats are used among the plurality of files and each file is associated with a corresponding in-memory model.

In certain examples embodiments, at least one of the observable elements and at least one over the observer elements are associated with data from different files and/or different in-memory models.

In certain examples embodiments, the multiple different structured file formats includes Extensible Markup Language (XML) and JavaScript Object Notation (JSON) file formats.

In certain examples embodiments, the observer object that shares the same attribute with the first observable object is a plurality of observer object that share the same attribute with the first observable object, where each one of the plurality of observer objects invokes (e.g., is tied to invocation of) a corresponding generated handler.

In certain examples embodiments, the processing system is further configured to maintain a master store of observable objects and observer objects and for each for each observable object that has been generated for a new in-memory model, generate a first list of observer objects from the master store of observer objects that each share the same attribute for the corresponding observable object associated with the new in-memory model. The list of observer objects is then added to the observer objects associated with the new in-memory model.

In certain examples embodiments, the processing system is further configured to for each observable object in the master store, generate a second list of observer objects associated with the new in-memory model that share the same attribute for the corresponding observable object from the master store. The second list of observer objects is then added to the master store of observer objects.

In certain examples embodiments, the processing system is further configured to add observer objects and observable objects associated with the new in-memory model to, respectively, the master store of observer objects and observable objects.

In certain examples embodiments, determination that the at least one of the data elements is annotated as an observer or observable is based on determining that data element is annotated during the loading of the at least one file.

Certain example embodiments provide for a multi-subscribe technique where a model element can be observable for multiple topics and observer for multiple topics. For example, in a products inventory application the quantity of a product depends on the sale of that product and any if the product is sold. In this example, the product quantity may be tagged as observer for topics like change in the purchase quantity of the product and the product quantity in the procurement order.

Certain example embodiments provide for a flexible configuration. In certain examples, configurable event and change (observer) handlers are stored into an external configuration file. Thus the specifics of the event handlers which perform actions on an element of a model and change handlers that handle the change at the observers are externalized to a configuration file.

Certain example embodiments provide multi-model support where change in a model can be notified to the observers in multiple models using a merging functionality. Such functionality may be advantageous when there are multiple types of models which are dependent on each other. For example, in a cost management application, consider that there is a PriceIndex.xml file and Prodcutsjson file. The PriceIndex.xml may contain factors which influence the profitability of a company like the "ProfitIndex", and the Products.json may contain the data about each product like Name, Price, etc. . . . . Accordingly, if a change in the ProfitIndex in the PriceIndex.xml may be propagated to change the prices of all the Products in the Products.json file.

Certain example embodiments provide a declarative framework where observable elements and observer elements are identified by just tagging them with topics. For example, declarations of observable or observer may be used like the following example, @Observable (topics={"priceIndex"}) @Observer (topics={"priceIndex"}).

Corresponding methods and non-transitory computer readable storage mediums tangibly storing instructions for performing such methods also are provided by certain example embodiments, as are corresponding computer programs.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 1 is a block diagram of an example system that may be used to implement the processes shown in FIGS. 2A-9.

DETAILED DESCRIPTION

Certain example embodiments described herein relate to multi-subscribe, configurable, multi-model, and declarative techniques for handling changes to event models and propagating those changes within the same model and/or to different models. In certain examples embodiments, an event store is created and maintained and new event models are added to the event store. The event store contains a collection of the events and observers from each event model and each event model may include the events that have been registered for each topic in the model. Similarly, each event may be associated with an event handler (e.g., a handler for event actions) and an observer handler (e.g., a handler for changes to be carried out). In certain examples, the handlers are stored in an external configuration file (see e.g., 904 in FIG. 9) that allows for custom implementations on a per handler basis. In certain example embodiments, the handlers can be programmatically added via an application program interface (API). In certain example embodiments, the a model element can be observable for multiple topics and observer for multiple topics. In certain example embodiments, a notification of a change in one model can provided to the observers associated with multiple other models by using merge functionality. It will be appreciated, that such implementations may help when there are multiple types of models which (e.g., which may be dependent on each other). In certain example embodiments, elements of a model may be identified as observable or as an observer by tagging the elements with topics.

Figure 2A:
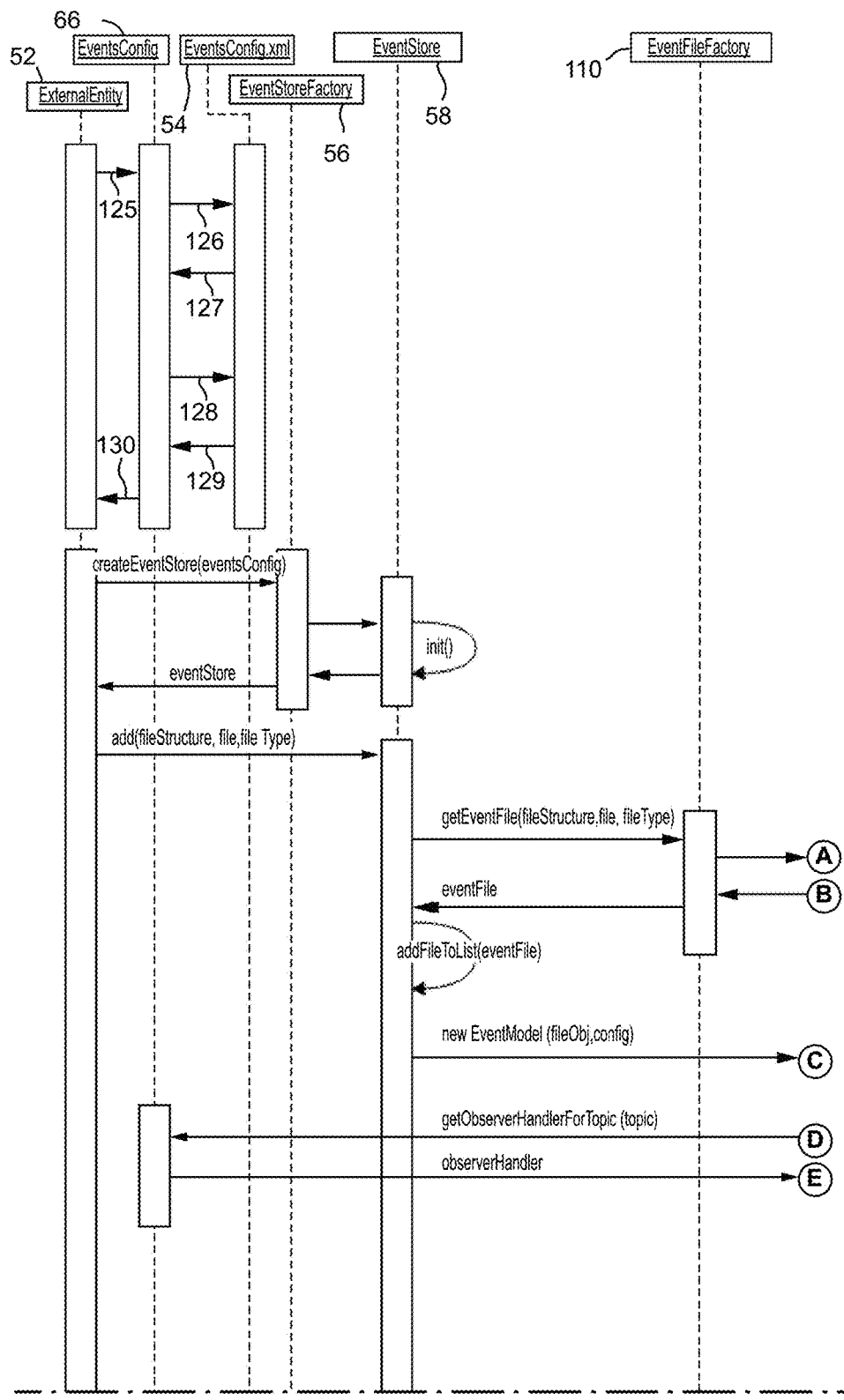
FIGS. 2A-2E are signal diagrams that illustrate interactions between components of an example computer system.
Figure 2B:
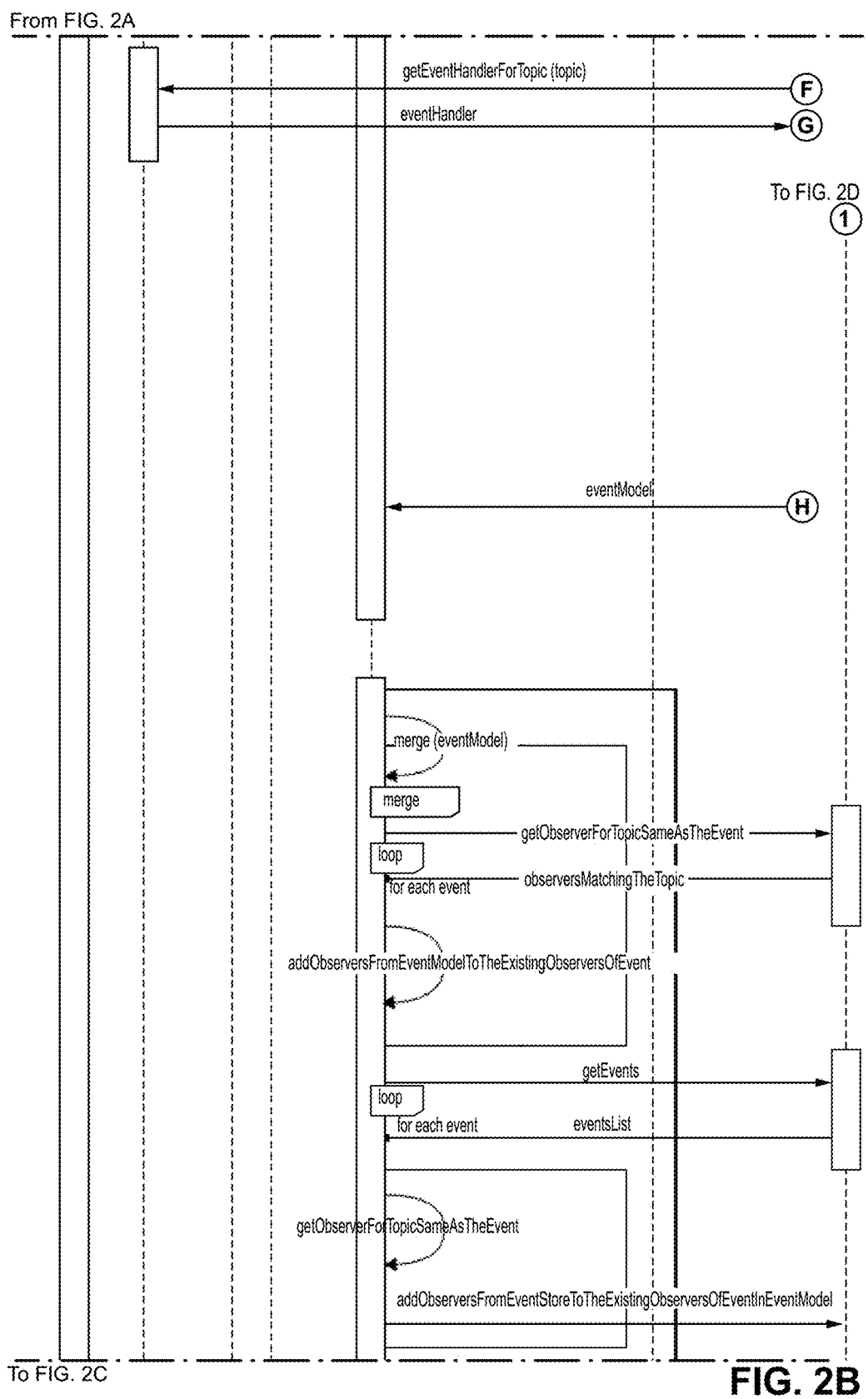
Figure 2C:
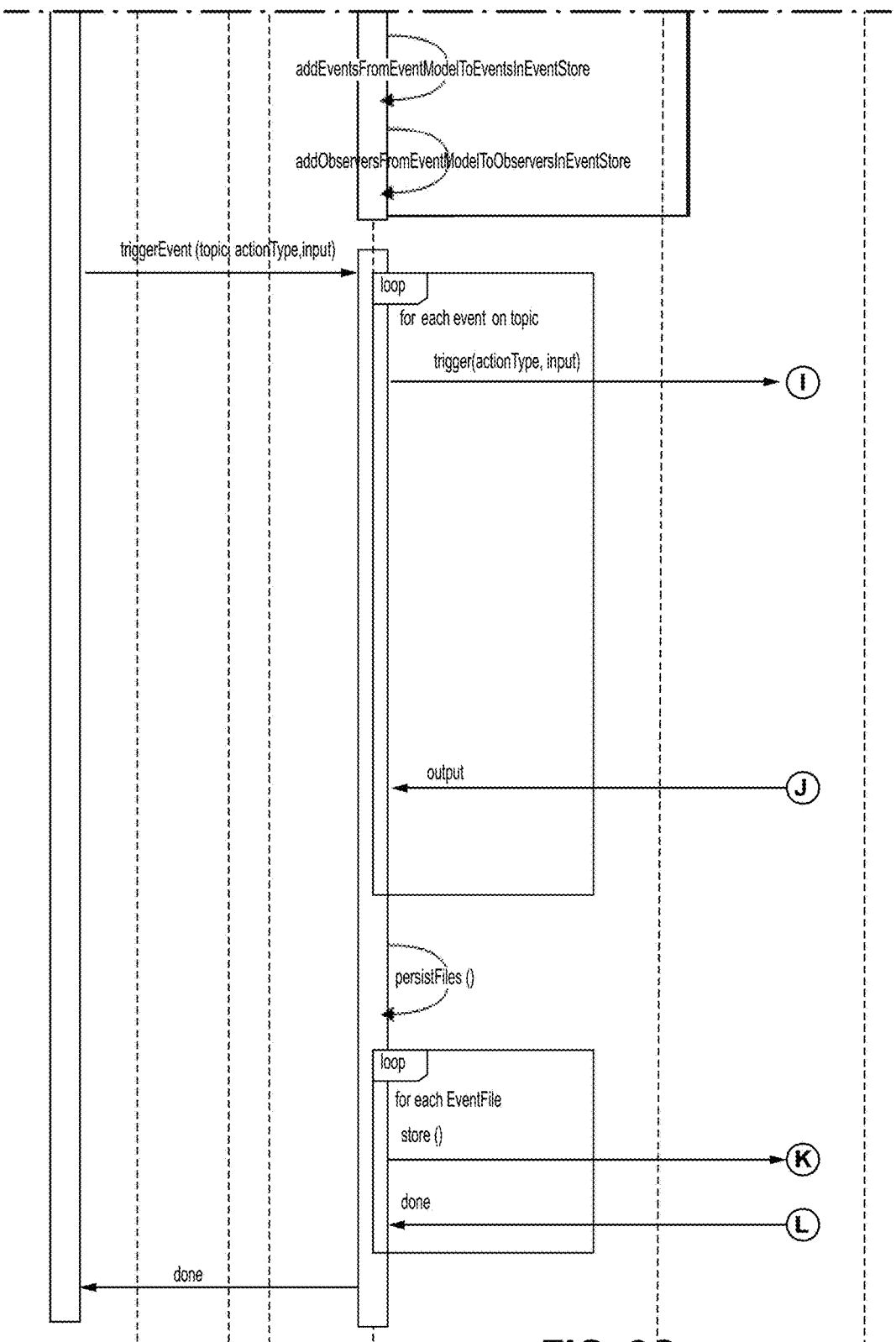
Figure 2D:
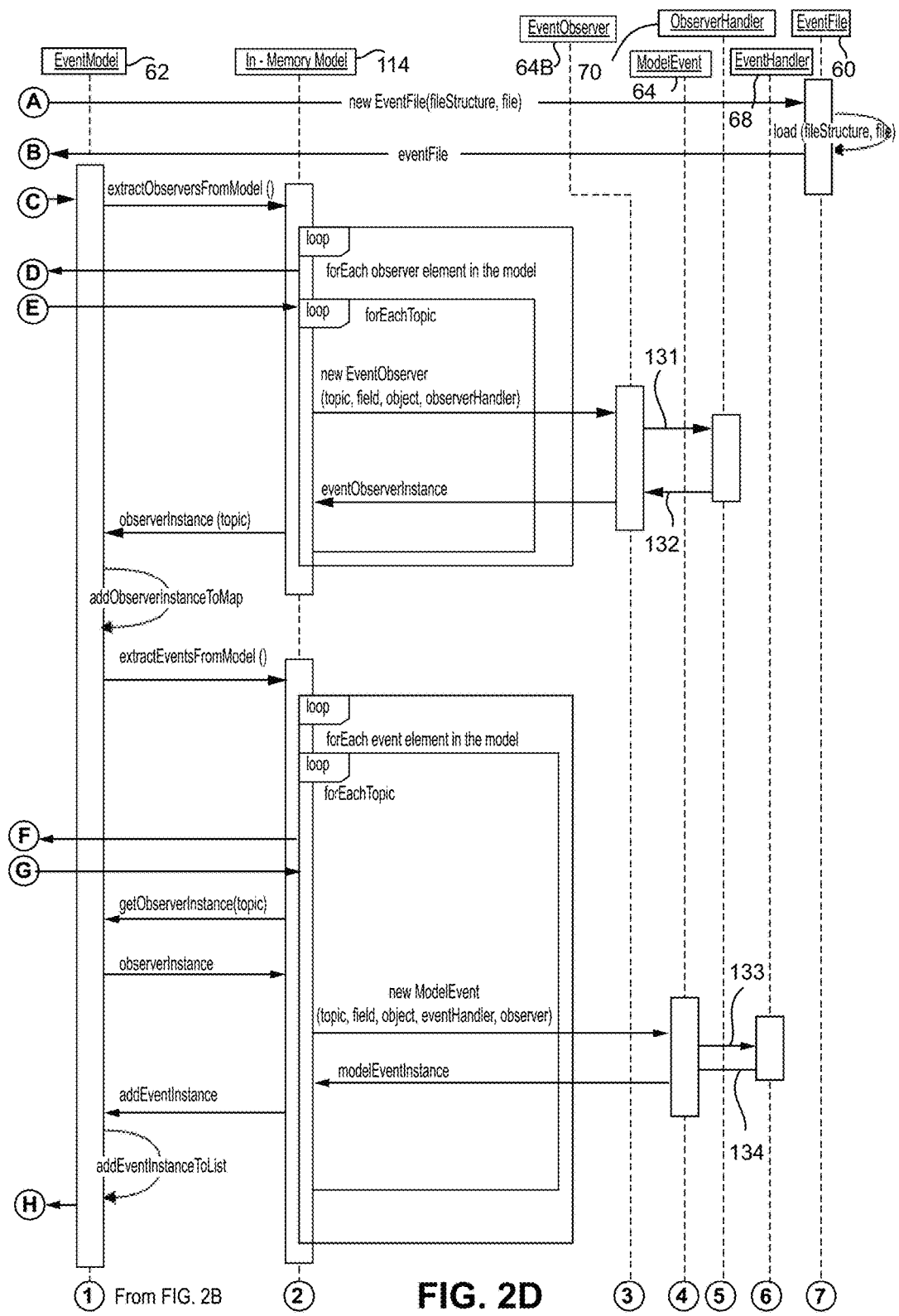
Figure 2E:
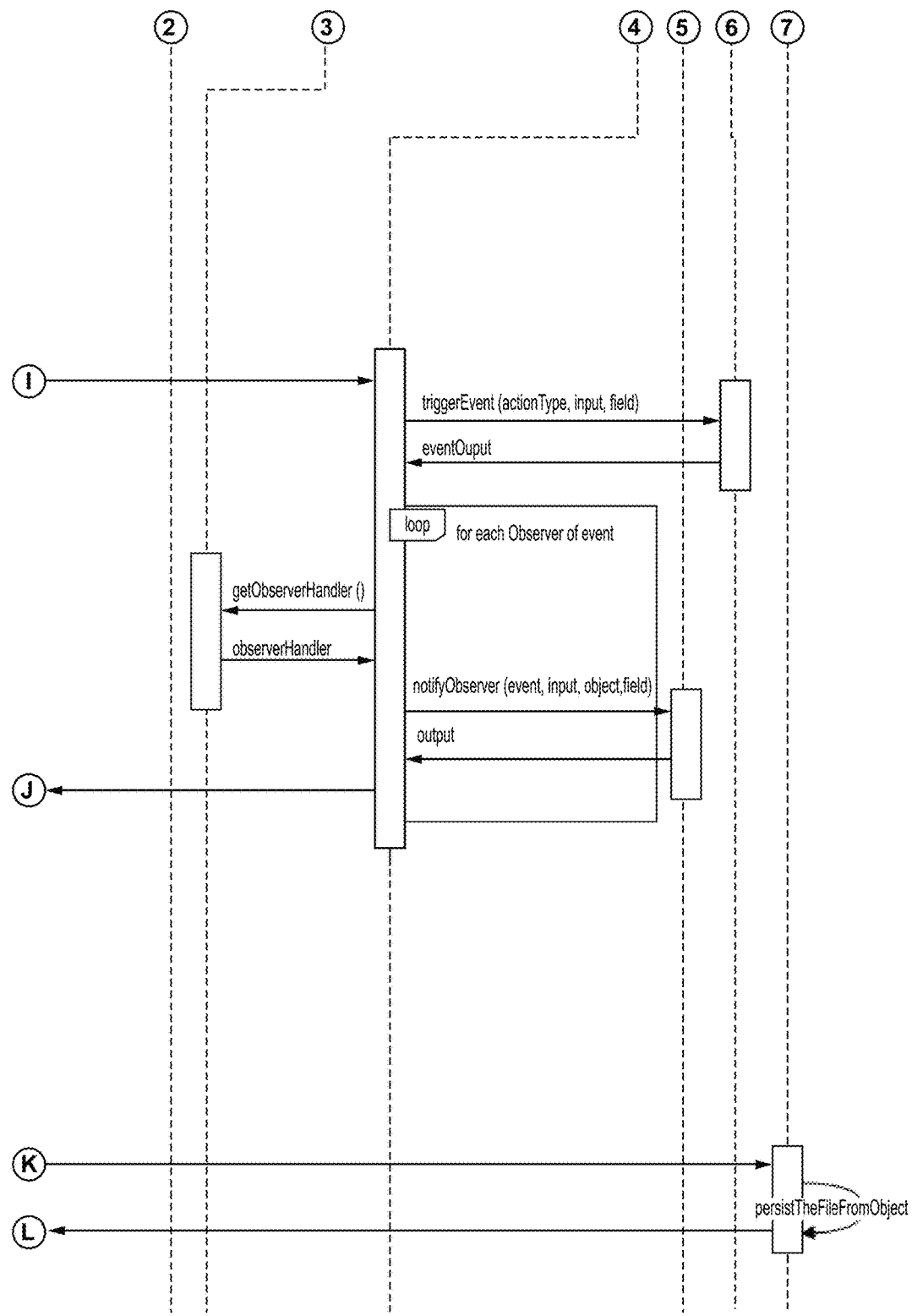

In many places in this document, including but not limited to in the description of FIGS. 1-2E, software modules and actions performed by software modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 10.

Sections are used in this Detailed Description solely in order to orient the reader as to the general subject matter of each section; as will be seen below, the description of many features spans multiple sections, and headings should not be read as affecting the meaning of the description included in any section.

FIG. 1

Figure 13:
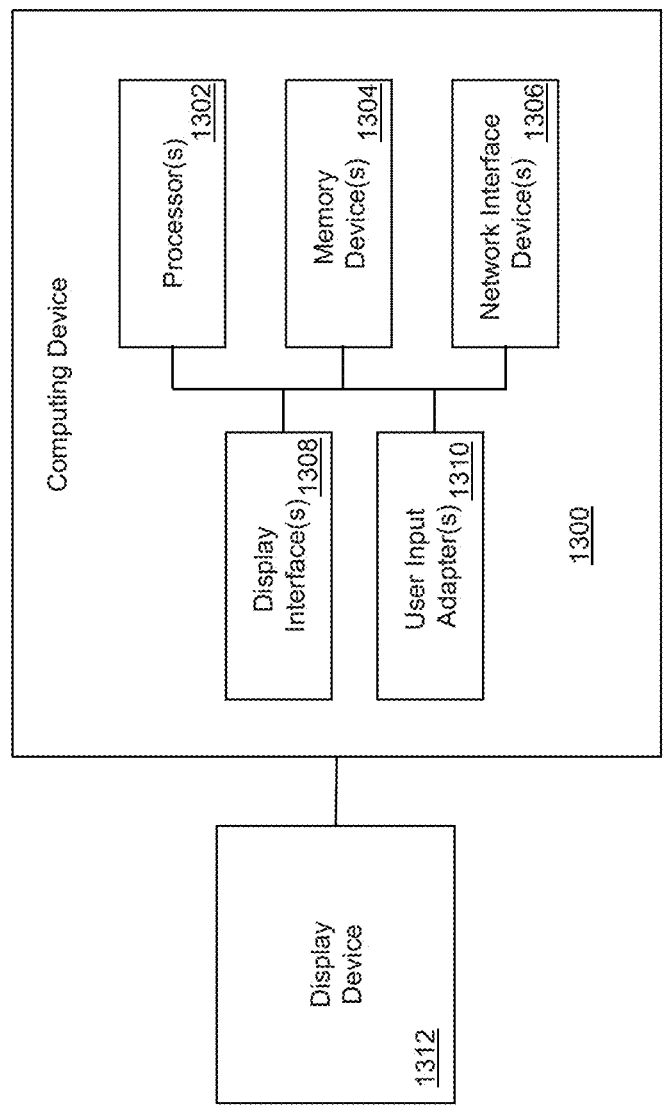
FIG. 13 is an example computer system according to example embodiments.

FIG. 1 is a block diagram of an example system that may be used to implement the processes shown in FIGS. 2A-9. System 50 communicates with external systems 52. In certain example embodiments, an external system 52 includes a computer system that is external to system 50. In certain example embodiments, an external system includes computer readable storage media that stores files generated from computer-based models that have persisted to storage. System 50 may be a software module (e.g., an application programming interface or API) executed on a computer system—such as the computer system shown in FIG. 13. External systems 52 and system 50 may be modules on the same computer system (e.g. as shown in FIG. 13).

As shown in FIG. 1, external system 52 interacts with and/or otherwise electronically communicates with system 50 using EventFactory 56 to create EventStore 58. For example, an API call is made to EventFactory 56 from a system that is external to system 50.

EventStoreFactory 56 returns a concrete implementation of an EventStore. An EventStore contains the master list of Events and Observers from all the files that have been imported and whose in-memory models have been added to the EventStore. In certain example embodiments, a single EventStore is created for all files and their corresponding in-memory models. In certain examples, the EventStoreFactory 56 may be used to create multiple separate EventStores that each contain their own (or in certain instances overlapping) in-memory models of the various files. For example, one event store may handle models for one subsidiary and another for another subsidiary of an organization. In certain examples, multiple event stores may be used because the requirements of storing all models in memory may be too large for one computer system. The EventStoreFactory 56 may take an optional parameters that references the EventsConfig 66 object. If there are no current eventsConfig objects, this value may be null and the EventStoreFactory 56 may create a new eventsConfig file. The following is an example class structure for EventStoreFactory 56:

TABLE 1

EventStoreFactory
• createEventStore(eventConfig)

The EventsConfig 66 object is an object that is created by loading external configurations for event handlers and observer handlers and subsequently storing the loaded configurations in a collection data structure (other types of data structures may also be used). EventsConfig 66 may also provide users or programs with functionality to add event handlers or observer handlers programmatically on a per topic basis. In certain examples, a topic is an area of interest per element in the model. The following is an example class structure for EventsConfig 66.

TABLE 2

EventsConfig
• EXTERNAL_CONFIG_FILE
• customEventHandlers
• customObserverHandlers
• getCustomEventHandlers( )
• getCustomObserverHandlers( )
• addCustomEventHandlers(topic, handler)
• addCustomObserverHandler(topic, handler)

The "EXTERNAL_CONFIG_FILE" member variable may be a string or other pointer to the file that is stored in a computer file system.

When the createEventStore function of the EventStoreFactory is executed it returns a created EventStore 58.

EventStore 58 includes the list of ModelEvents, Observers, EventFiles and EventModels. When a file is added to the EventStore 58, it is converted to an internal, in-memory representation of the file—as EventFile object and all the Model Elements and Observers are extracted out of the file and stored in the EventStore. Events may then be triggered using the Event store for a given topic. An example of a class structure of EventStore 58 is shown in below table 3:

TABLE 3

EventStore
• modelEvents
• Observers
• eventFiles
• eventModel
• getEventFieldTypes( )
• getEvents( )
• getEventsForFieldType(type)
• getObservers( )
• add(fileStructure, file, fileType)
• trigger(topic, actionType, input)

Here the EventStore object includes a master list or collection of "modelEvents" and "Observers." Also included is a collection or list of eventFile and eventModel Objects.

The created EventStore 58 includes EventFiles 60 and EventModels 62.

An EventFile is how a file is represented in the system 100 so that it can be parsed for Events and Observers. An EventFile object is initialized with information regarding the file. This information may include, for example, the file structure 60A, the actual file (or a pointer thereto) 60C, an in-memory representation of the file 60B, and the file type. In certain example embodiments, each file type may have its own loading implementation because the different file types (e.g., that are provided or determined when loaded) may have different loading and/or storing requirements. For example, a model that is stored in an XML format may have a separate file representation as part of EventFiles 60 than a model that is stored in a JSON format.

EventFile 60 may also handle loading the file to an in-memory model and then persisting the in-memory model back to the same or different file (e.g., either updating an existing file or creating a new file). In certain examples, when all the events are successfully triggered in the event store, each EventFile 60 may be persisted so as to save or store the changes to the in-memory representation of the corresponding EventFile 60. The following is an example class structure for the EventFile 60:

TABLE 4

EventFile
- fileStucture (e.g., 60A in FIG. 1)
- file (e.g., 60C in FIG. 1)
- inMemoryFileObject (e.g., 60B in FIG. 1)
- load( )
- store( )

The other part of the EventStore 58 includes EventModels 62. An instance of EventModels 62 may be initialized in response to or based on the creation of EventFile 60 (e.g., an instance thereof). Once initialized (as discussed in greater detail in connection with FIGS. 2A-2E), the process reads the in-memory model (e.g., 60B) of the EventFile for observable and observer elements for a topic. The identified observable and observer elements for a topic are eventually registered with a master or central collection of events and observers that is part of the created EventStore. An example class structure for an EventModel 62 is shown below:

TABLE 5

EventModel
- ModelEvent modelEvents (e.g., 64)
- EventObserver modelObservers (e.g., 64B)
- extractObserversFromModel( )
- extractEventsFromModel ( )

The structure includes a list or collection of ModelEvents 64 and a list or collection of EventObservers 64B and is used for extracting (via the defined member functions) such elements from a model to thereby add them to EventStore 58.

The following is an example class structure for ModelEvent 64.

TABLE 6

ModelEvent
- String topic
- Field field
- Object fieldOjbect
- ModelEventHandler eventHandler (e.g., 64A in FIG. 1)

TABLE 6-continued

- List<EventObserver> eventObservers (e.g., 64B in FIG. 1)
- getTopic( )
- getEventField( )
- getFieldObject( )
- trigger(action, input)
- getHandlerInstance(eventHandler)

A ModelEvent holds the information about the Event registered per observable element in the model (e.g., as determined from the extractEventsFromModel member function). It contains the information about the topic, field (an example of this is the "basisindex" element in 1200 of FIG. 12), object of the field (an example of this is the "StockIndex" element in 1200 of FIG. 12), EventHandler 64A for this event, and a list of EventObservers 64B that are related to this event. In other words, the list of eventObservers details which other elements in other (or the same) models are observing this particular element of the model. As described in greater detail herein, these observing elements may be updated should the observable element be updated. The update functionality is triggered by the "trigger" member function of the ModelEvent. When an action is triggered by this function, the external event handler (e.g., 68 in FIG. 1) is invoked, and then for each observer the external observer (e.g., 70 in FIG. 1) handlers are invoked.

The following is an example class structure for EventObservers 64B:

TABLE 7

EventObserver
- String topic
- Field field
- Object fieldOjbect
- ObserverHandler observerhandler
- getTopic( )
- getEventField( )
- getFieldObject( )
- getObserverHandler( )
- getHandlerInstance(observerHandler)

Each instance of EventObserver holds information about a corresponding observer element of a corresponding model. This includes the information about the topic, field, object of the field, and the Observer Handler (e.g., 70).

The handlers that are used for both the observable and observer elements may conform to the following interfaces. The following is an example interface structure ModelEventHandler that is implemented by custom event handlers 68 (e.g., all custom event handlers may implement this interface definition):

TABLE 8

<<interface>> ModelEventHandler
triggerEvent(actionType, input)

The ModelEventHandler interface defines the interface requirements for those applications that customize the event handling. The individual implementations are external and stored in an external handlers configuration file 54.

The following is an example interface structure for ObserverHandler 70 that is implemented by custom observer handlers 70:

TABLE 9

<<interface>> ObserverHandler
notifyObserver(event, input)

The ObserverHandler interface defines the interface requirements for those applications that customize the logic of notifying the observer elements of a change. Like the custom event handlers, the definitions of the custom observer handlers are stored in external handlers configuration file 54.

FIGS. 2A-2E

FIGS. 2A-2E collectively show a signal diagram of an example sequence of interactions (e.g., programmatic interactions between different software modules and other components that are provided on at least one computer system) that occur between above discussed components of the system shown in FIG. 1.

In step 125, ExternalEntity 52 (also referred to as external system 52) requests a new instance of the EventsConfig 66 object. Example code for such a request may be "new EventsConfig( )" to create a "new" instance of the EventsConfig 66 class discussed above. When a new instance of EventsConfig 66 is instantiated, the member function "getCustomEventHandlers( )" of the EventsConfig 66 object in step 126 is called. The getCustomEventHandlers( ) function loads the custom event handlers defined in the EventsConfig.xml file 54 that is stored to a storage system accessible by the computer system that executes the process.

In step 127, the loaded custom event handlers are stored in a collection (other types of data structures may also be used) member variable of the EventsConfig 66 object.

In step 128, the custom observer handlers are loaded from the EventsConfig.xml file 54 by invoking the "getCustomObserverHandlers( )" member function of the EventsConfig 66 object. In step 129, the loaded custom observer handlers are stored in a collection (other types of data structures may also be used) member variable of the EventsConfig 66 object. In steps 130, the created EventsConfig object 66 is returned to external system 52.

The external entity then invokes the createEventStore member function of the EventStoreFactory 56. The previously created EventsConfig object 66 may be passed as a variable as part of the createEventStore function call. In certain examples, the creation of a new EventsConfig object may be included as part of the create event store function. The EventStoreFactory 56 may then instantiate a new EventStore 58 object using the created EventsConfig object 66. Instantiation of the EventStore object 58 may trigger the "init( )" member function of the EventStore object 58. The newly created EventStore object 58 is returned to the EventsStoreFactory 56 and then to the external system 52.

After creating a new EventStore object 58, the external system 52 may then invoke the "add" member function of the EventStore (as shown above in table 3). The add member function takes a fileStructure, file (e.g., a pointer to where the file is located in memory or in a storage system), and fileType as variables for this function call. In certain examples, the fileStructure variable determines the Program model of the file which could be represented as an in-memory mode. For example, a Java class representation of a file structure. In certain examples, the fileType may denote the type of file (e.g., a .xml file, a .json file, etc. . . . ). In certain instances, the file contents are loaded into the in-memory model of a fileStructure based on the fileType value.

The EventStore object 58 then invokes the getEventFile function of the EventFileFactory 110, which takes the fileStructure, file, and fileType variables passed to the previous function call.

EventFileFactory 110 instantiates a new EventFile object 60 and passes the fileStructure and file variables in as parameters for the newly instantiated EventFile object 60. The newly instantiated EventFile object 60 invokes the member function "load" that uses the fileStructure and file parameters to load the indicated file from storage (e.g., from a hard disk or other persisted storage). As discussed herein, the files that are being loaded are defined in a structured format such as XML or JSON. As part of this process an in-memory (e.g., stored in volatile memory) representation of the file may is created and stored to the "inMemoryFileObject" member variable of the EventFile 60 object. The newly instantiated EventFile object that has loaded a file is then returned to the EventFileFactory, which, in turn, returns the instantiated EventFile 66 to the EventStore object 68.

Next, the EventStore object 58 adds the new EventFile 66 object to a list or collection (e.g., the "eventFiles" member variable as shown in the above table 3) by invoking the "addFileToList" member function and passing in the new EventFile 66 object as a variable for that function call.

EventStore 58 then instantiates a new EventModel object 62 and passes, as variables for the instantiation, "fileObj" and "config." These variables may, respectively, be the in-memory representation of the file that has been loaded as part of the EventFile object 60 and the EventsConfig object 66 that includes the definitions for the custom event handlers and custom observer handlers. In certain examples, these variables may be pointers to the respective objects.

The instantiated EventModel object 62 may then invoke member function extractObserversFromModel( ) on the in memory representation of the model 114 (e.g. using the previously obtained pointer for that in-memory representation). This function determines or otherwise extracts the elements that have been tagged as observer elements from the in-memory representation of the model. In certain example embodiments, an element (e.g., in a Java example) is tagged (e.g., before being loaded into memory) using a Java annotation or other annotation technique. For example, an element in the file of the program model may be marked as observable using "@Observable" while another element in the file (or another file) may be marked as an observer using "@Observer." During the initial importation of the file to an in-memory model the process may identify or recognize these annotations and then appropriately define an object in the model as an observer or observable.

In certain example embodiments, elements of a model may be annotated programmatically. For example, the elements of a model may be tagged as observer elements if a particular string (e.g., "Address") is used in the element. In certain examples, observable and/or observer elements may be tagged in a manual (e.g., by expressly including an annotation in the text of the file or when the model is initially created or updated) or programmatically (e.g., be deciding whether an element should be tagged based on its properties or attributes). Other types of tagging techniques may also be used.

The extraction process that is part of this function may include two loops. The first loop processes the elements of the in-memory model 114 and identifies each element that is annotated or otherwise declared as an observer element.

The second loop includes processing each topic. For each topic that is identified, the getObserverHandlerForTopic function of the EventsConfig 66 object is invoked. This member function returns the information regarding the specific observerHandler for the identified topic. In certain examples, multiple observer objects may be registered to a single topic. For example, different observer handlers may be created to handle changes to an address element of a model. In certain examples, a single observer object may be registered for multiple topics. For example, a single observer handler may be registered with a first topic related to the address of a customer and a second topic related to the address of a producer. The same handler may handle changes to either element in the same (or different) model.

Upon returning the observerHandler information for the identified topic, a new EventObserver 64B object is instantiated based on the topic, field, object, and the observerHandler information. The newly instantiated EventObserver 64B then instantiates a new ObserverHandler 120 object at step 131. The new ObserverHandler 120 object at step 131 is based on the custom observerHandler information that had been previously stored in the external events config file. The new ObserverHandler 120 object created at step 131 may implement or be based on the interface definition shown in Table 9. The new instance of ObserverHandler 120 is then returned and added as a member variable of the EventObserver object 64B. The instance of the EventObserver object 64B is passed back to the in-memory model 114, and then back to the EventModel object 62 where it is added to a map (e.g., a map data structure) of EventObserver objects based on the topic (e.g., the key to the map being the topic and the value being the EventObserver object). It will be appreciated that other types of data structures may be used to store a plurality of EventOverserver objects that may be created according to the techniques described herein.

The EventModel object may then invoke the extractEventsFromModel() function to extract those elements that are observable elements (e.g., those elements that will trigger actions when changed).

Similar to the extractObserversFromModel function, there may be two loops performed for this function. The first loop may retrieve each event or observable element in the model and the second loop may loop over each topic of the model. As part of the second loop, for each topic, the getEventHandlerForTopic() function of the EventsConfig 66 object may be invoked by passing in the identified topic. The EventsConfig 66 object may then read the custom information regarding the event handler for that topic and return that information.

Next, the getObserverinstance(topic) function of the EventModel 62 object may be invoked. This function may look up the observer instances (e.g., which may be one or multiple observer instances) that have the identified topic (e.g., in the map data structure discussed above that uses topics as a key). This returns one or more observer instances that are passed in as a variable when a new ModelEvent 64 object is instantiated (see Table 6 above). Along with the one or more observer instances, the new ModelEvent 64 object takes topic, field, object, and eventHandler as variables. During the instantiation process, the ModelEvent 64, instantiates, in step 133, a new EventHandler 68 object based on the eventHandler information read from the EventsConfig.xml 54 file. The new EventHandler 68 object is added as a member variable of the ModelEvent 64 object in step 134.

The new instance of ModelEvent 64 is returned and then added to a list of eventinstances in the EventModel 62 object. Upon completion of the two extract functions, the EventModel object is returned to the EventStore 58 object.

The next part of the process relates to merging the new data from the recently loaded event file(s) to a central or master record of EventModels (e.g., that correspond to multiple different files). This part of the process is shown on FIG. 2B and continues onto FIG. 2C.

First, a merge function of the EventStore 58 is invoked that takes the newly created EventModel 62 as a parameter. The merge process includes two separate loops.

In a first loop, each event that is already included in the EventStore 58 is looped over and a GetObserverForTopicSameAsTheEvent( ) function of the EventModel 62 is called. This function returns the observers that match on the topic for the event that is already part of the EventStore 58. In other words, if an event in the EventStore 58 is associated with topic X, the function will return the observers from the newly created EventModel 62 that are for topic X. The observers that match the topic from the newly created EventModel 62 are then added to the existing observers of the event in the EventStore 58. This process continues for all of the events that where already present in the EventStore 58.

Next, the EventStore 58 retrieves the events (e.g., as a list) that are part of the newly created EventModel 62. The EventStore 58 then loops over all of events of the EventModel 62 and for each event, the EventStore 58 determines if there are any Observers for the topic of the event in the EventStore 58. In other words, if an event in the EventModel is for topic Y, then the process will determine, via the getObserverForTopicSameAsTheEvent function call, the observers that are already in the EventStore 58. For those events that have observers in the EventStore 58, the observers are added to the list of Observers in the EventModel 62 via the "addObserversFromEventStoreToTheExistingObserversOfEventInEventModel" function call. This second loop repeats for all of the ModelEvents 64 of the new EventModel 62.

After the two loops are completed, the EventStore 58 invokes two functions. These functions add the events and observers of the newly created EventModel 62 to the global or master event store.

Next, the EventStore 58 waits for an event to trigger. The triggering may be initiated via the external system 52 by invoking a triggerEvent function that takes the topic being trigged, the actionType (e.g., whether the trigger is related to a create, update, delete, or other type of trigger), and the input. In certain example embodiments, the triggering may be from an external program through which a user provides input. Once the triggerEvent function is called, the EventStore 58 determines what ModelEvents 64 to trigger based on the topic associated with each event. In certain examples, this is accomplished by looping over the list of ModelEvents and determining those events that match on the given topic. In other examples a map may be used to retrieve a collection of ModelEvents that match the map key (e.g., the topic). In any event, the trigger member function of those ModelEvents that match the indicated topic are invoked. As shown in the above table 6, the trigger function takes the "action" and "input" values as variables.

The ModelEvent associated with the element of the model that has been triggered then invokes the triggerEvent function of EventHandler 58 for that corresponding ModelEvent. In certain instances, this function takes the actionType and input values as variables and in other examples it takes the actionType, input, field, and/or object as variables. As explained herein, the logic for each EventHandler may be defined in the external configuration file and vary based on application needs. In certain examples, a default logic for handlers may be used.

After invoking the triggerEvent function of the EventHandlers object, an "eventOutput" value is returned (e.g., returned by the custom event handler). In certain example embodiments, the output may be used by the customer Observer Handler, which may be notified upon completion of execution of the customer event handler.

The process then continues by looping over each one of the EventObservers that are stored as a member variable of the instances of the ModelEvent associated with the element of the model that has been triggered. For each one of the EvertObservers, the corresponding ObserverHandler is retrieved by calling the "getObserverHandler( )" member function. The ObserverHandler is returned to the ModelEvent object, which then calls the notifyObserver function for a given ObserverHandler. The notifyObserver function then updates the value(s) associated with the model element for the given observer declaration. In other words, the value of the Observer object or element maybe updated using the notifyObserver function. The result of the notifyObserver function is returned to the ModelEvent instance. In certain instances, the result of the notifyObserver function may be used to indicate or represent the status of the notification from the Observer object or element.

The output results from the trigger member function of the ModelEvent instance are returned to the EventStore. As noted above the process will loop over each event of the triggered topic.

Once the looping process is complete, the EventStore 58 invokes persistFiles( ). This function call causes the in-memory representation of the models that have been updated to persist those changes to the corresponding files (e.g., saving the changes to non-volatile storage such as a hard disk, an solid state drive, flash memory, or the like). This includes looping over the EventFile list or collection of the EventStore object and invoking the store member function for each of the EventFile objects. Part of the storing process includes using the persistsTheFileFromObject function that takes the in-memory representation of the EventFile and stores to a file that is handled by the file system (e.g., an eventfile that is based on a file called products.xml is updated and/or recreated based on this function). The process continues for all of the EventFiles until all have been updated. The process then returns to waiting for triggering of an event and/or adding a new EventFile to the EventStore.

The following figures and discussion relate to example use cases that may be implemented according to certain example embodiments described herein.

Example Use Cases

Figure 3:
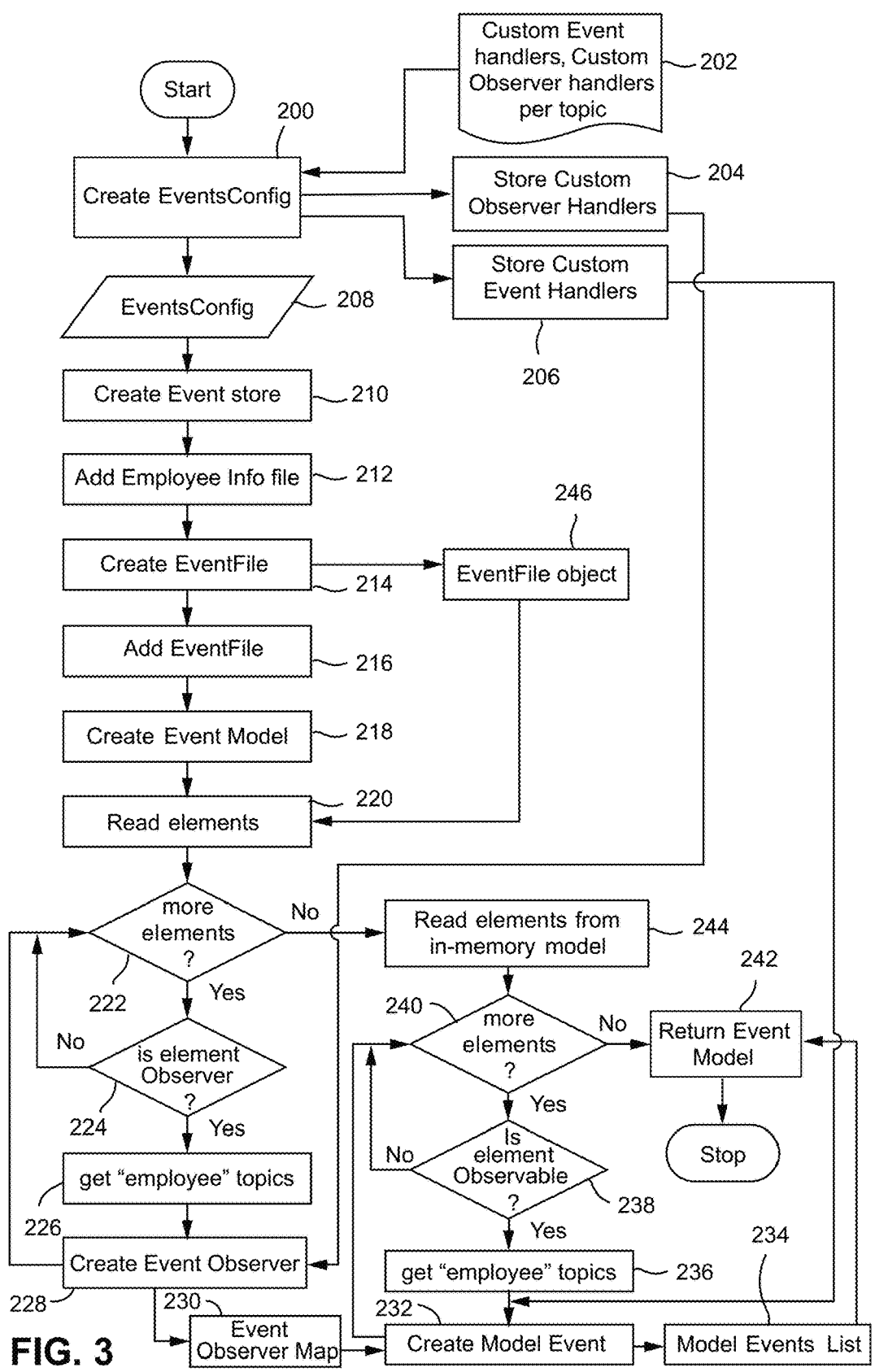
FIG. 3 is a flow chart of a process for creating an event store according to certain example embodiments.
Figure 4:
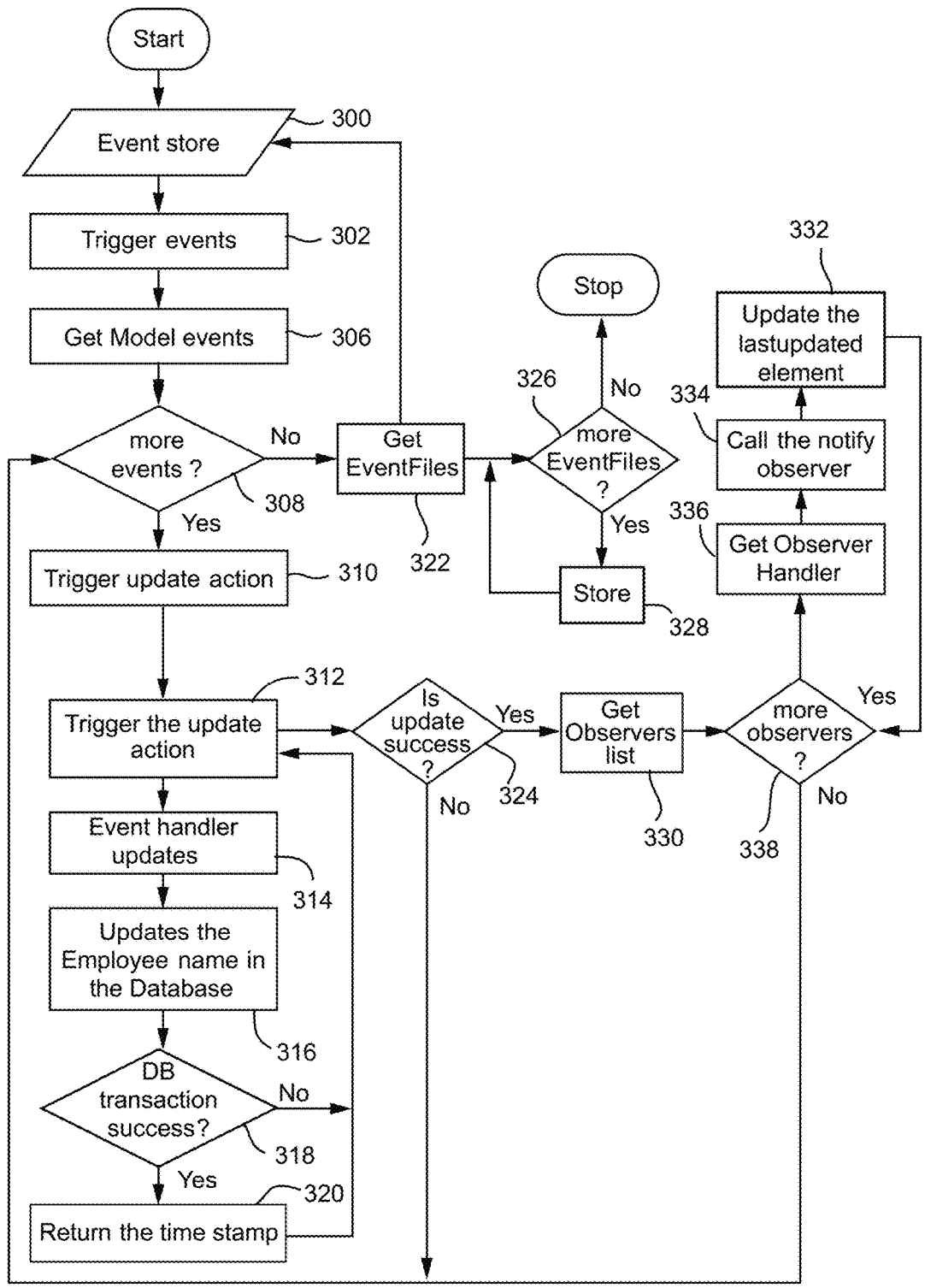
FIG. 4 is a flow chart of a process for triggering events of an event store created in FIG. 3 according to certain example embodiments.
Figure 10:
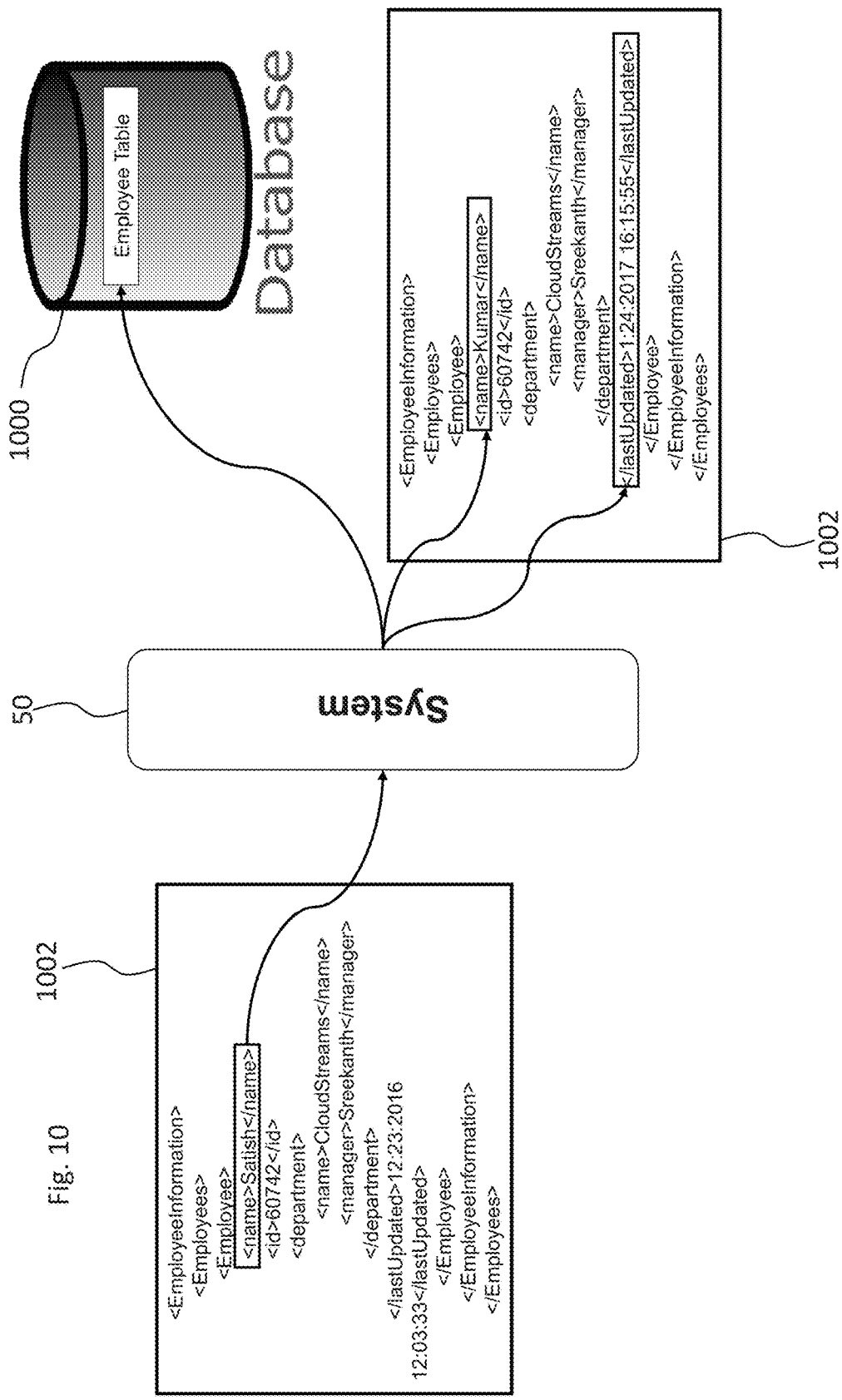
FIGS. 10-12 are example illustrations used in conjunction with FIGS. 3-9.

FIGS. 3, 4, and 10:

FIGS. 3, 4, and 10 show an example use case that occurs when a change in an element in a file triggers an observer in that same model. FIG. 3 shows a flow chart representation of a process that occurs when adding the new file and corresponding elements to the EventStore. FIG. 4 shows a flow chart of a process that occurs when an element of the file in FIG. 3 is triggered. FIG. 10 illustrates the files being used in the examples shown in FIGS. 3 and 4.

In this example, consider a company that stores employee information. This information may be present in multiple different systems. In this example, an employee information xml file and a database that includes an employee table are present for the example company. One of those locations (e.g., a human resources database 1000 in FIG. 10) may be considered the "master data store" for that company. With such a system any change in the information of an employee in the employee xml file (e.g., 1002a) may need to trigger the same changes in a database 1000 and the details of the database transaction should be updated in the xml employee file.

Here, file 1002a contains information about each employee of the company, and an update to the name of an employee may update the record in the database. And if the update is successful, then the LastUpdated element in the EmployeeInformation may also be updated with the timestamp of the database transaction.

In such a scenario with traditional event handling techniques the change observers could be scattered across multiple systems. Thus, changing how updates are handled might require refactoring the notification logic of each observer. However, according to the techniques herein, the change handling is externalized to an external configuration file. This allows the handling to be unified at one location.

In such kind of systems a change in the master data may update the data in the corresponding external entities as well. In this example let's assume that EmployeeInformation.xml contains information about each Employee, and an update in Employee name updates the record in the database. Further, if the update is successful in the Database, then the LastUpdated element in the EmployeeInformation should be updated with the timestamp of the Database transaction.

When the employee xml is loaded, the Employee name element is marked as Observable for topic "employee", and the LastUpdated elements are marked as Observers for topic "employee." Next, a custom event handler is created called "EmployeeUpdateHandler" that will handling the change to an employee name and update the database 1000. An observer handler will also be generated to handle updating the LastUpdated element in the Employee.xml 1002 file. These handlers are then saved to the external configuration file. The XML for such a file may look like the following:

```
<?xml version="1.0" encoding="UTF-8" standalone="yes"?>
<events>
    <event type="custom" topic="employee" handler="EmployeeUpdateHandler">
        <observer handler="EmployeeChangeHandler"/>
    </event>
</events>
```

When the in-memory model of EmployeeInformation.xml is loaded into the system, the framework will parse the model for Observer elements and create Event observers with the custom change handlers. The process will parse the model for the Observable events and create a ModelEvent with the custom handler to handle the event and the Event observer to handle the change once the event is triggered. Accordingly, once the model has been loaded according to the techniques described herein, the event store for the employee model will include a collection of model events.

FIG. 3 shows an example of the process of loading the employee XML 1002 file.

In step 200, the process begins by the EventsConfig object 208 by using the external config file 202. During this process the custom observer handlers are stored, in 204, in a map data structure with the key as the topic and the value as the ObserverHandler object. Similarly, the custom event handlers are stored to a map with the key as the topic for the handler and the value as the EventHandler object.

In step 210, the EventStore is created with the EventsConfig object as input. In step 212, the Employee XML file is added as a file to the EventStore. In step 214, a new EventFile object 246 is created that takes the file, file structure, and file type as inputs and loads the file object. In step 216, the newly created EventFile object is added to the files collection of the EventStore. In step 218, an EventModel object is created and in step 220, the elements from the in-memory representation of the employee file are read.

Step 222 is part of a loop that tests if there are any more elements to read from the in-memory model. If there are no more elements, the process moves to step 244, which is discussed below. If there are additional elements, then the process, in step 224, determines if the element is annotated or decorated with an Observer declaration. If it is not, the process returns to step 222. If the element is an Observer element, then the process moves to step 226 where the "employee" topics of the Observer element are retrieved or otherwise determined. In step 228, EventObservers are created per topic. The creation of EventObservers includes linking an observer Handler for this topic from the stored custom handlers in 204. The EventObservers are stored in a map data structure 230 with the topic the EventObserver is associated with being the Key and the EventObserver being the value.

Returning to step 244, the elements of the in-memory model are read and in step 240 another loop is started. If there are more elements in step 240, then the process proceeds to step 238 where it is determined if the current element is annotated as an observable element. If it is not, the process returns to step 240. If the element is an observable element, the process proceeds to step 236.

In step 236, the employee topics of the observable element are retrieved or otherwise obtained. In step 232 a new ModelEvent is created per topic that includes information of the element, the Event Handler from step 206, and the EventObserver for that topic from step 230. The newly created ModelEvent is added to the model events list in step 234.

If there are no more elements in step 240, then, in step 242, the EventModel that contains a list of Observers (230) and a list of ModelEvents (234) are returned to the EventStore. The EventStore now contains a list of ModelEvents for the employee XML file.

FIG. 4 is a flow chart of the process that occurs when an event is triggered by an update to the employee name in the XML file. At step 300, the EventStore includes a list of ModelEvents and the EventFile object(s) that includes the in-memory representation of the employee XML file.

At step 302, events for the topic "employee" are triggered via an update action that has the new name (Kumar) as input. At step 304, the ModelEvents list in the event store is retrieved and in step 306 a loop is started for each event in the list. If there are no more events, then the process moves the step 322. If there are more events, the process moves to step 310.

In step 310, the update action of the current ModelEvent is triggered. In step 312, the update action of the EventHandler for the ModelEvent event is triggered. This triggers the custom event handling. For this custom handler, two updates are performed. Once is for the employee XML file 1002 and the other is for the database 1000. In step 314, the event Handler updates the name of the employee in the XML file 1002. In step 316, the event handler connects to the database and updates the Employee name in the employee table of the database 1000. In step 318, if the database transaction is not a success the process returns to step 312. If the database transaction was a success the process returns the timestamp of the database transaction at step 320.

In step 324, the process determines if the update was successful. If the update was not successful, then the process returns to step 308. If the update was successful, the process moves to step 330 and retrieves the ObserverList for the current ModelEvent.

With the ObserverList, another loops starts at step 338. If there are no more observers, the process returns to step 308. If there are more observers, the process retrieves the observer handler for the current Observer in step 336 and then calls the notify observer function of the handler in step 334. In step 332, the custom process for the observer handler is started. Specifically, the Observer handler updates the last updated element with the timestamp received from the EventHandler in step 320. The process returns to step 338.

In step 322, all of the EventFiles that are part of the EventStore are received and the process begins a loop process at step 326 for each EventFile. For each of the EventFiles, the file is stored (e.g., saved) to the file system in step 328. If there are no more EventFiles, the process terminates until the next trigger.

Figure 5:
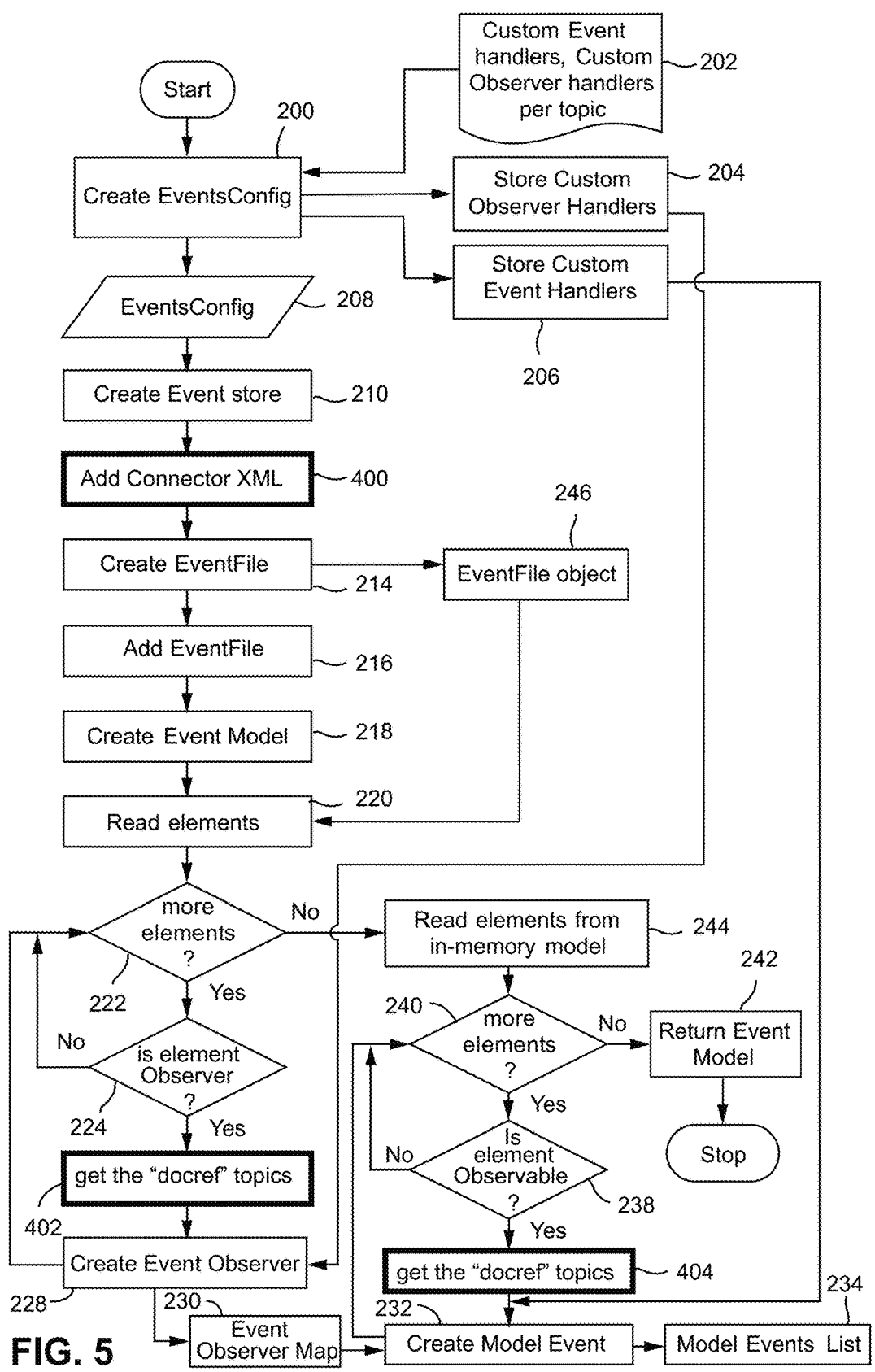
FIG. 5 is a flow chart of a process for creating an event store for a connector descriptor according to certain example embodiments.
Figure 6:
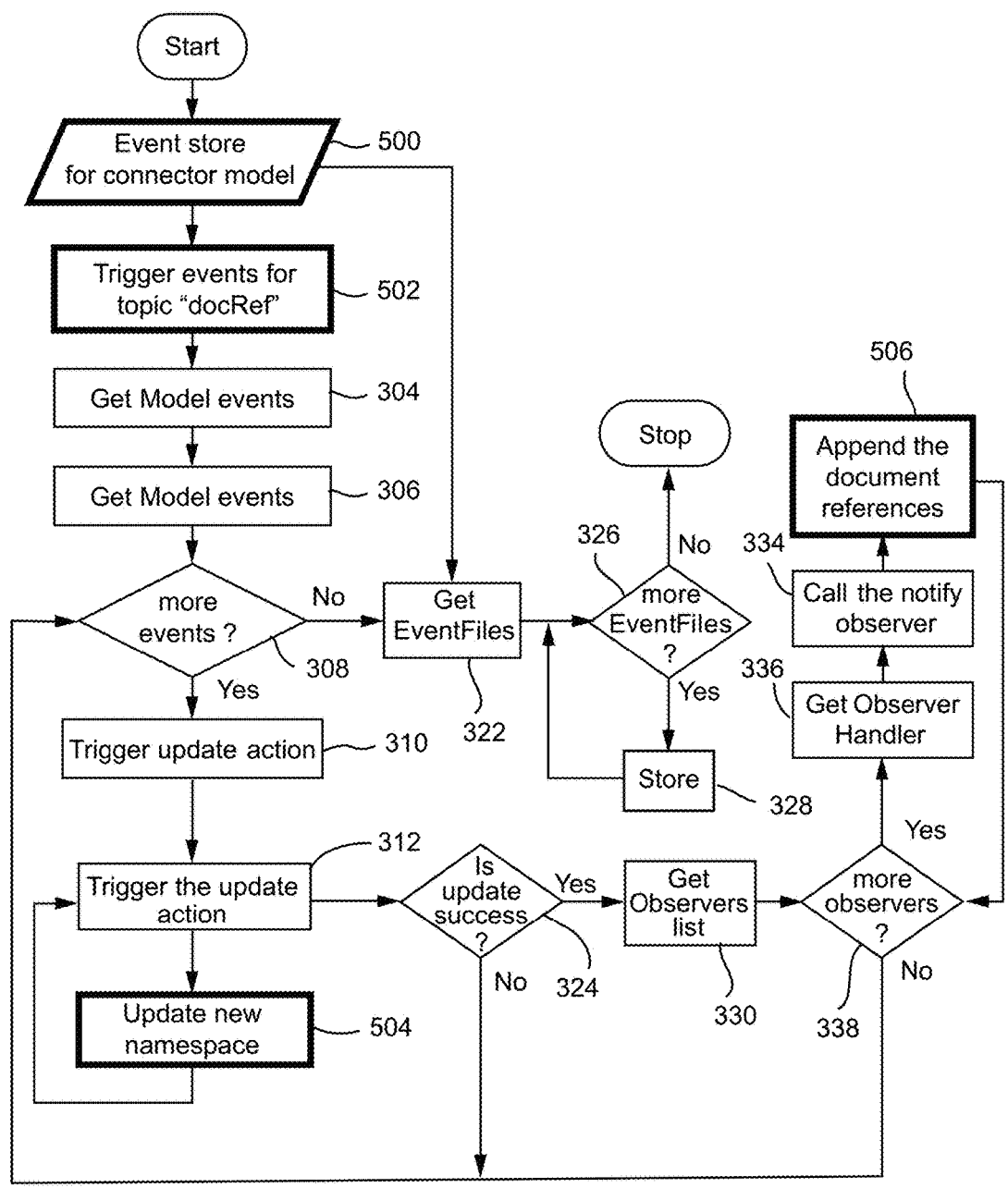
FIG. 6 is a flow chart of a process for triggering events of an event store created in FIG. 5 according to certain example embodiments.
Figure 11:
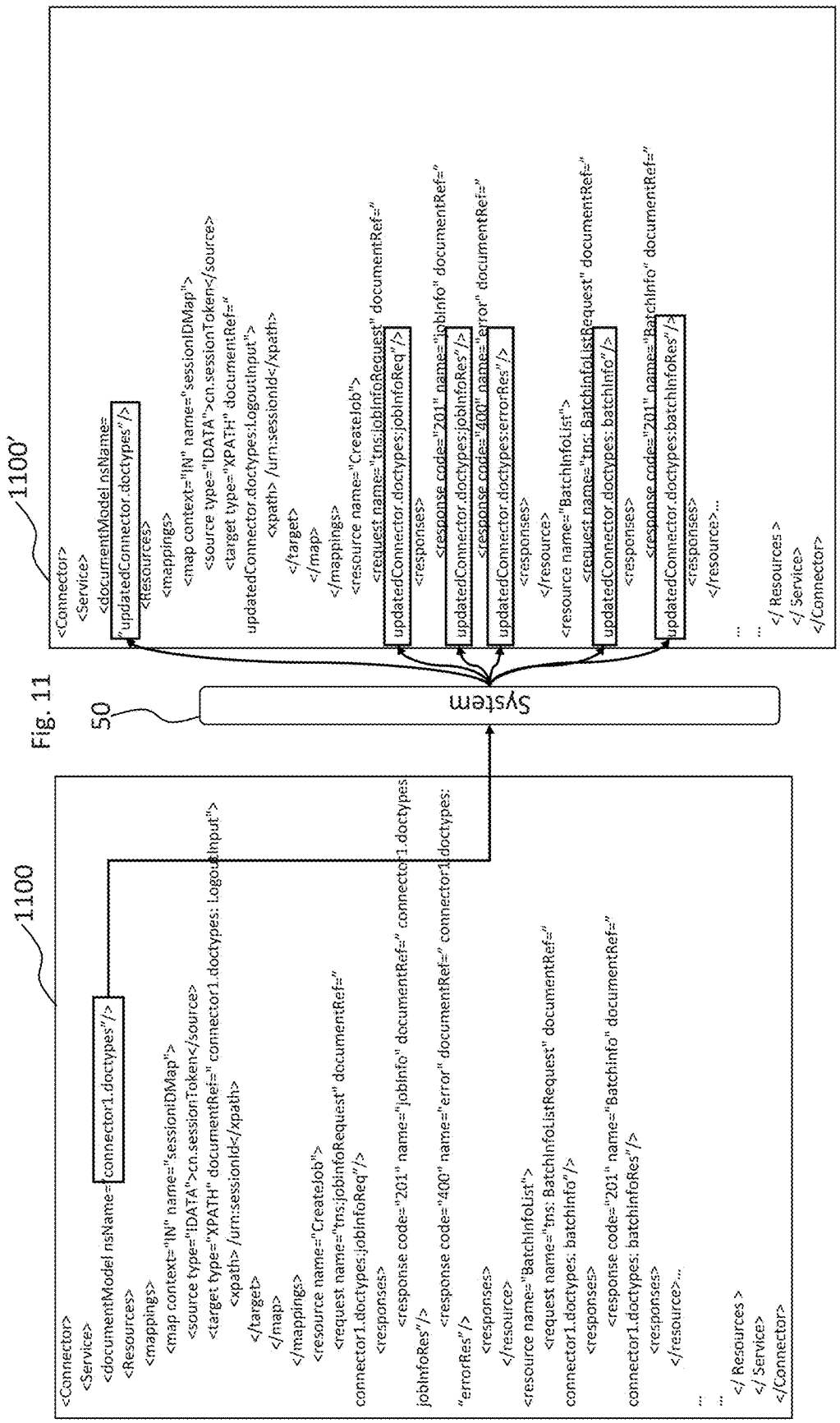

FIGS. 5, 6, and 11:

In this next example, a change in an element triggers an update for multiple elements in a nested structure in the same model. Here, a Connector Description file (XML) 1100 is provided and a change in the namespace of a document model should update all the document references with the updated namespace (as shown in 1100').

In the example scenario, the connectivity to any software as a service (Saas) backend is defined as a Connector Description file which is in XML format. All the resources to connect to the backend are defined in a component called "Service." Each service has a document model which represents the document sources for all the Resources. A document model has a namespace which is the location for all the documents. And each resource refers to this namespace and defines its document name appended to the namespace. For example, if the namespace of a document model is wmConnector_v31.doctypes, then a document reference could be wmConnector_v31.doctypes:createReqDocument. The document types are referred in multiple elements like Parameter, Request, Response, Map Type, etc. . . . .

With such an implementation there is a possibility that there are lots of document references and any change in the document model namespace may need to update each other document reference in the file.

In the in-memory model of the Connector Descriptor, the element "nsName" in the Document model is tagged as Observable for topic "docRef". And elements like Parameter, Resource Request, and Response where there is a document reference are tagged as Observer for topic "documentRef." A custom handler is then created, DocTypeEventHandler, to handle the doc type change in the Document model element. Similarly a custom observer handler is created, DocTypeChangeHandler, to handle the Observer change in the elements like Parameter, Request, Response etc. These are customized and stored in an external configuration file called EventsConfig.xml. For example:

```xml
<?xml version="1.0" encoding="UTF-8" standalone="yes"?>
<events>
   <event type="custom" topic="docRef" handler="DocTypeEventHandler">
      <observer handler="DocTypeChangeHandler"/>
   </event>
</events>
```

When the Connector XML model is loaded into the system, the framework will parse the model for Observer elements and create Event observers with the custom change handlers, then the framework will parse the model for the Observable events and create ModelEvents with a custom handler to handle the event and the Event observer to handle the change once the event is triggered. Once the entire model is loaded (e.g., the completion of the flowchart in FIG. 5) the Event store for the Connector model will contain a collection of ModelEvents.

FIG. 5 shows the flow of creating the eventStore and FIG. 6 shows how the events are triggered for the created event store. FIG. 11 illustrates the example file in a before 1100 and after 1100' state.

FIG. 5 is similar in steps to FIG. 3. Those elements that are different are bolded and include step 400, 402, and 404. These steps are basically the custom aspects of this implementation versus the overall process the is applied for each custom implementation. In step 400, the connector XML file is added to the EventStore. In step 402, if an element of the in-memory model is an observer element, then the "docRef" topics of the Observer element are obtained. In step 404, if the element of the in-memory representation is an Observable element, then the "docRef" topics of that element that are indicated as observable are obtained. Accordingly, an EventModel and EventStore (which includes the Event-Model) are created for the connector XML file.

FIG. 6 is similar to FIG. 4 and those elements that are different are bolded and include steps 500, 502, 504, and 506.

In step 500, the EventStore that includes the list of ModelEvents and EventFiles for the connector model is used. In step 502, events for topic "docRef" are triggered with an update action with the new namespace as input. In step 504, the custom event handler updates the namespace (e.g., the "nsName" attribute of the documentModel element) the document model with the new namespace name ("updatedConnector.doctypes"). In step 506, the custom observerhandler is called and appends the document reference of the observer element with the new namespace string value.

FIGS. 7, 8, 9, and 12:

This use case demonstrates a change in an element of a model triggering a change for multiple elements across different types of models. For example, in a stock trading platform the basis index for all the stocks are stored in an xml called StockIndex.xml. The information of all the stocks is stored in StockInformation.xml and the information about the client possessing the stocks is stored in ClientInformation.json.

In this example, the basis points in the StockIndex.xml decides the price of stocks. This stock information is present in multiple files like the StockInformation.xml which is a master file for all the Stocks information, and a ClientInformation.json file which holds the information about the particular stocks which a client possess. Hence, a change in the Basis index value in the StockIndex.xml file may update the prices of stocks present in the StocksInformation.xml and the value of stocks possessed by a customer in ClientInformation.json file.

In this type of scenario, using the existing parsing techniques like JAXB for xml and Jackson or GSON for JSON files, it may be a complex and maintenance intensive problem to have a unified event model.

In this example implementation, the element "basisIndex" of the in-memory model of StocksIndex.xml is tagged as an Observable element on the topic "basisindex." And in the in-memory model of StocksInformation.xml the "stockPrice" of the Stock element is tagged as Observer for topic "basisindex." For the in-memory model of ClientInformation.json the "stockPrice" of the Client element is tagged as Observer for topic "basisindex." Custom handlers are then created. BasisIndexEventHandler is created to handle the change of a Basis Index in the Stock Index model, and BasisIndexObserverHandler to handle the observer change for Stock price in Stocks Information and Client Information model. A reference to these handlers may be stored in the Configuration file as follows:

```xml
<?xml version="1.0" encoding="UTF-8" standalone="yes"?>
<events>
   <event type="custom" topic="basisindex"
handler="handlers.BasisIndexEventHandler">
      <observer handler="handlers.BasisIndexObserverHandler"/>
   </event>
</events>
```

In certain examples, the programmable logic for example event handlers and/or example observer handlers may be stored in an external software program file (e.g., a handler may be stored as a Java program in Java). In certain examples, other types of software programs or pieces of code may be used for the logic that backs the handlers (e.g., a common language runtime process, a compiled .dll or exe file, or the like). In any event, when the Stock Index model, Stock Information model, and Client Information model are loaded, the framework will create EventModels by parsing each model for Observer elements and create Event observers with the custom handlers, then the framework will parse the model for the Observable events and create a Model event with a custom handler to handle the event and the Event observer to handle the change once an event is triggered.

After loading is completed each EventModel will have an Event model which contains a collection of ModelEvents. Each EventModel is then added to the master EventStore. During each addition, the ModelEvents and Observers are merged to the Master collection of ModelEvents and Observers in the Event Store. This will synchronize the Events and Observers from all the three models—Stock Index, Stock information, and Client information.

Figure 7:
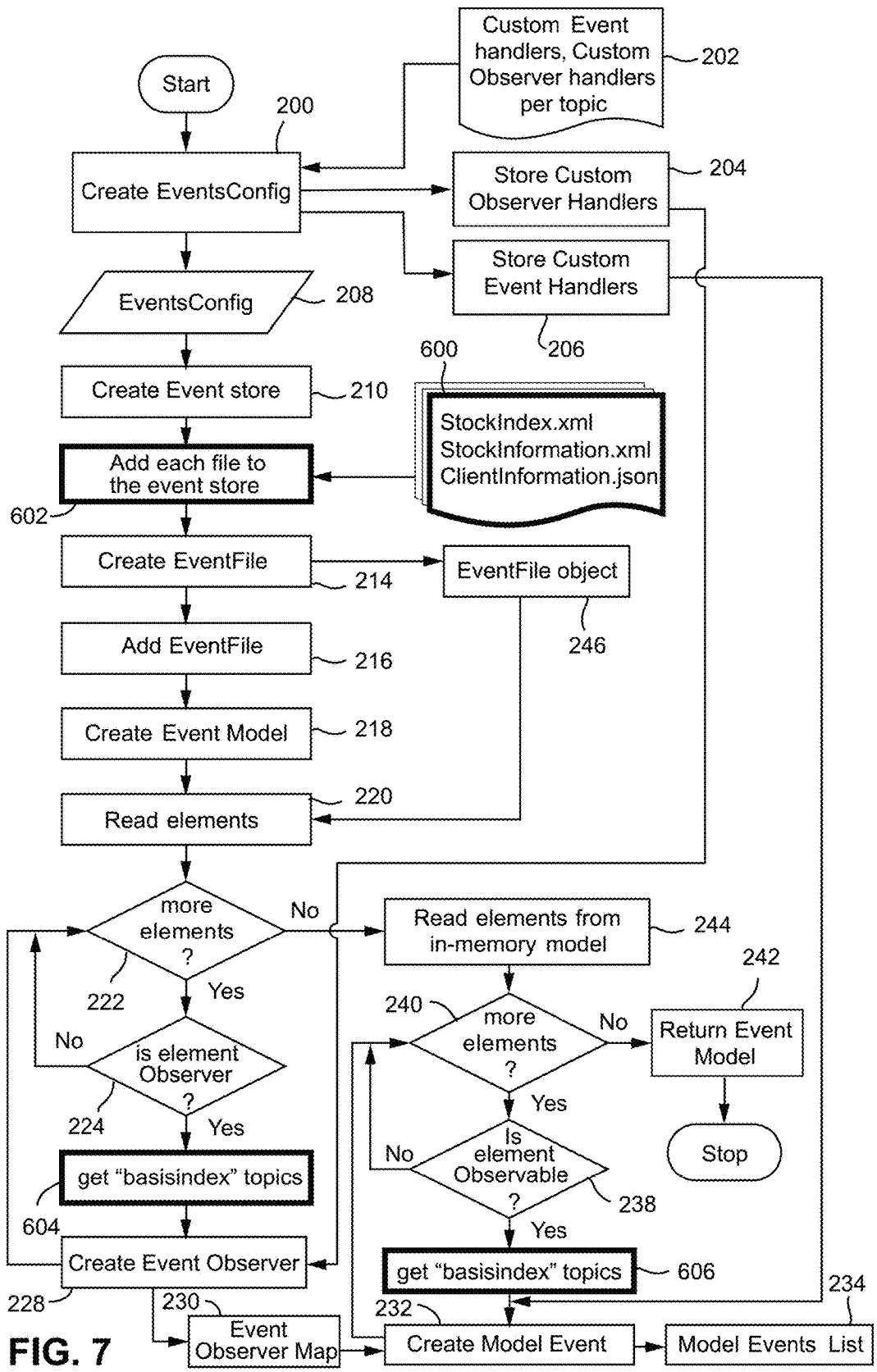
FIG. 7 is a flow chart of a process for creating multiple event models for multiple different models according to certain example embodiments.
Figure 8:
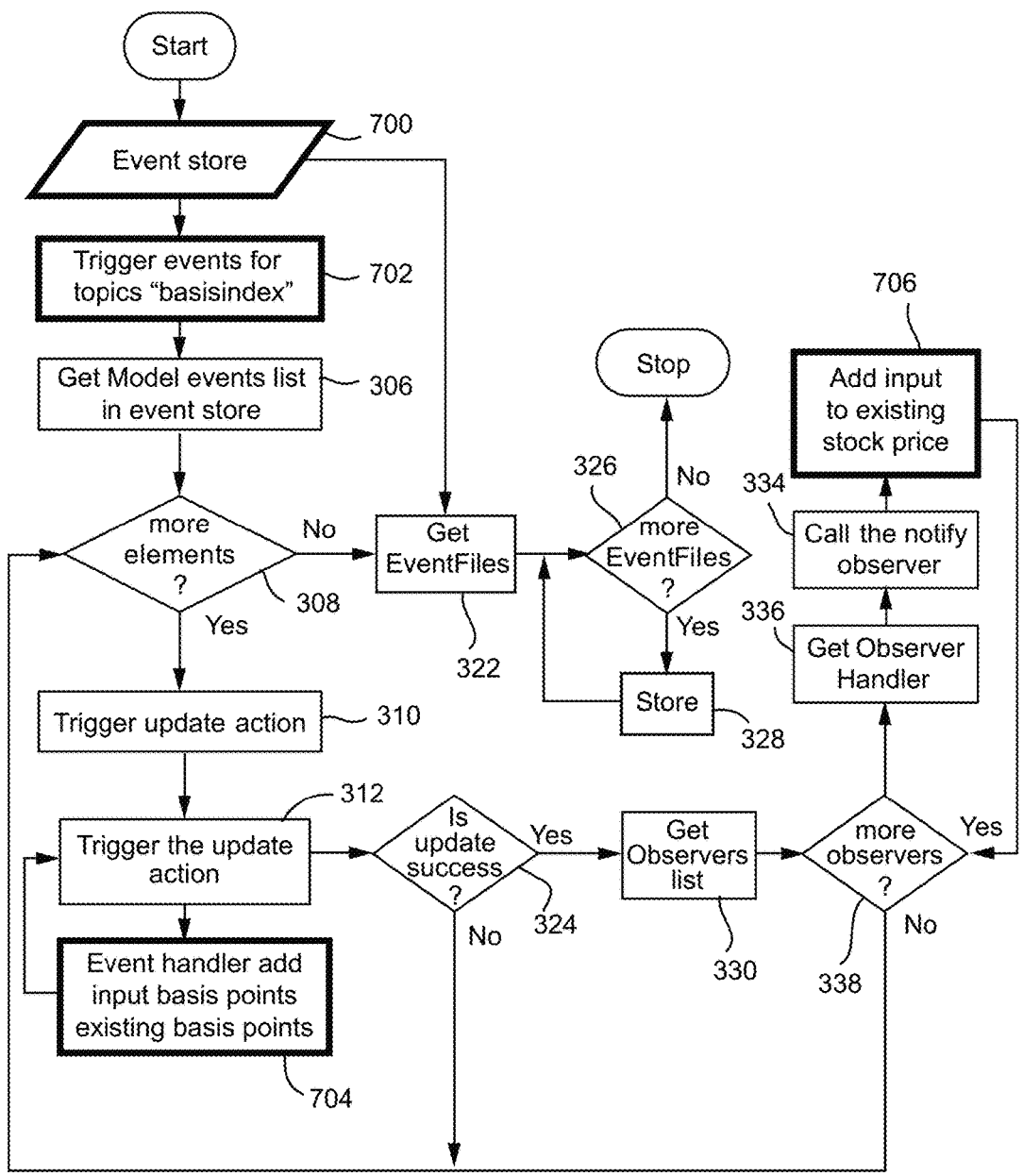
FIG. 8 is a flow chart of a process for triggering events of an event store based on the created event stores of FIG. 7 according to certain example embodiments.
Figure 9:
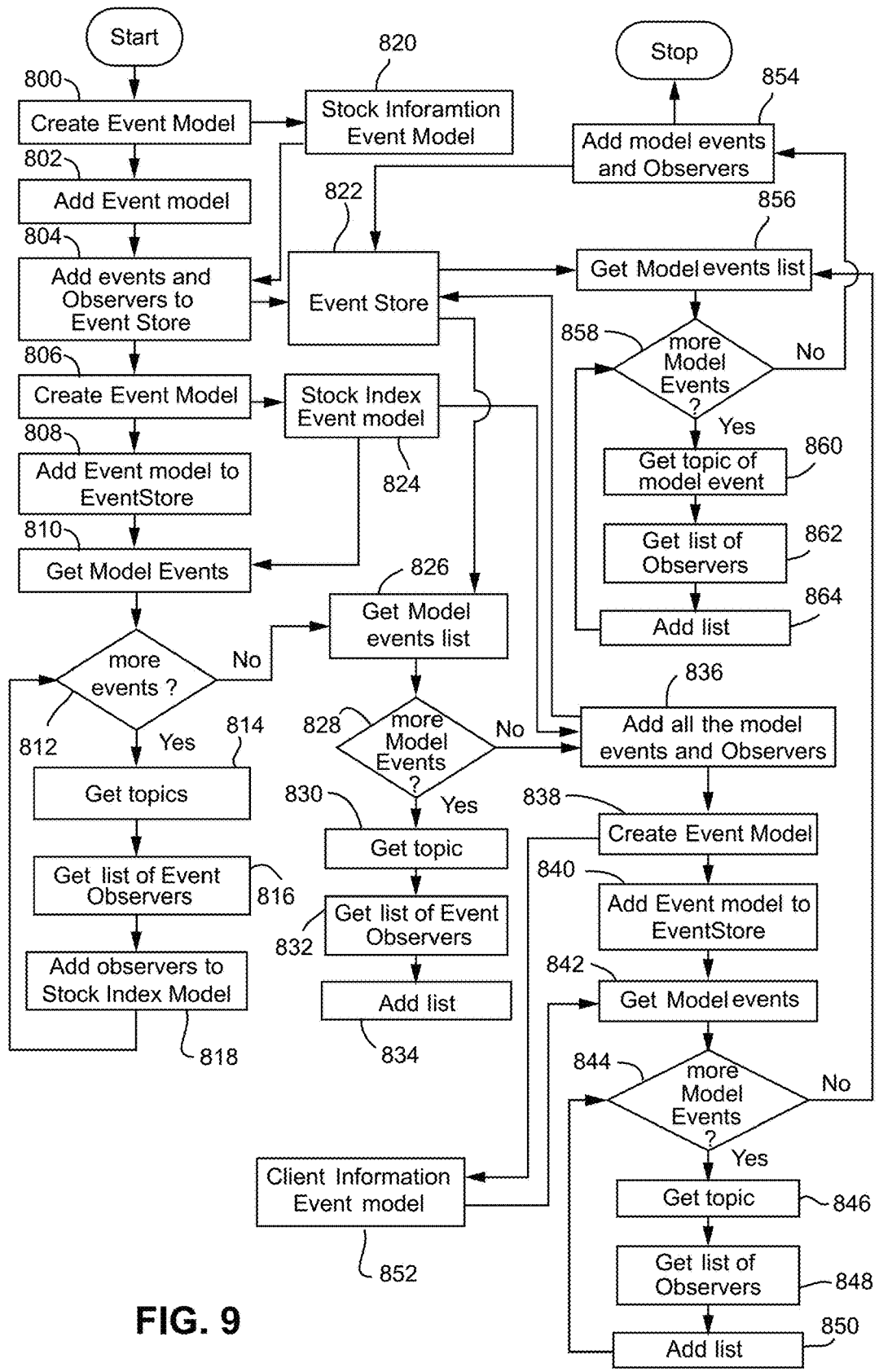
FIG. 9 is a flow chart of a process for merging the multiple event models created in FIG. 7 into a master store according to certain example embodiments.
Figure 12:
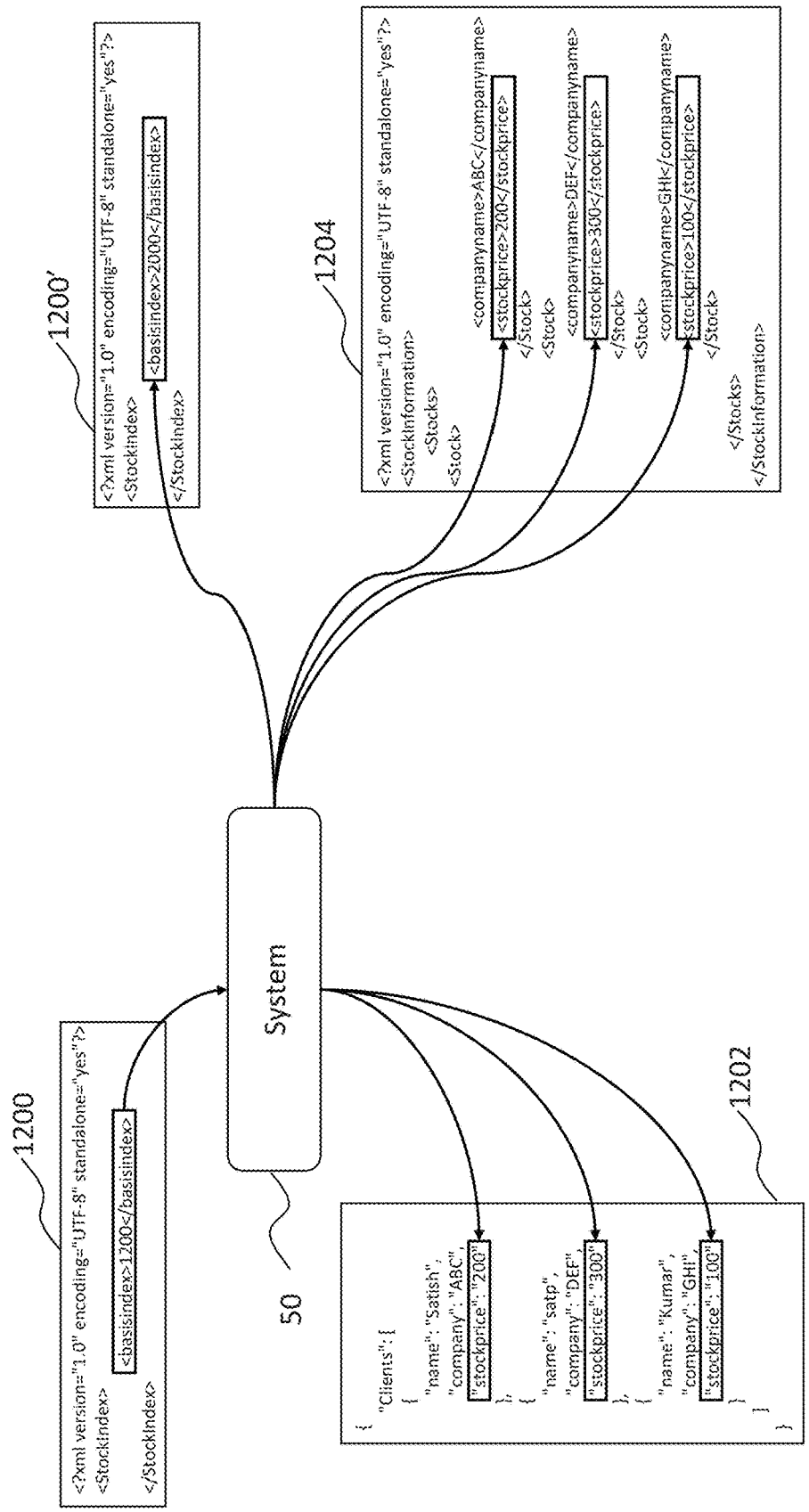

FIG. 7 shows the creation of an event models for each model. FIG. 9 shows the merging process for the different event Models (e.g., into a master event store). FIG. 8 shows the flow of triggering events for the merged EventStore. FIG. 12 shows the files that are used in this example.

FIG. 7 is similar to the steps shown in FIG. 3. The new elements are shown in Bold. In 602, files 600 are added to the EventStore. Specifically, each of StockIndex file 1200 (and XML file), StockInformation file 1204 (an XML file), and ClientInformation file 1202 (a JSON file) are added to a master EventStore, and the process shown in FIG. 7 is executed for each file.

In step 604, if the element of the in-memory representation of the model is an Observer element, the "basisindex" topics for that observer element are retrieved. In step 606, if an element of the in-memory representation of the model is an Observable element, then the "basisindex" topics of the Observable element are obtained. At the conclusion of executing the process in FIG. 7 for each of the separate files, there will be 3 separate EventModels.

FIG. 9 explains the process that occurs for merging the three different event models. In certain examples, the merging process can proceed once all EventModels have been created or may be executed on the fly as new EventModels are created. The process shown in FIG. 9 is just one example of how the 3 different event models may be merged. Other examples may have the ClientInformation Model be the "first" model that is added to a master store.

For the merge process, in step 800, the event model for the StockInformation file 820 is created (e.g., as shown in FIG. 7). This EventModel is added to the EventStore in step 802 and the events and observers of the EventModel for the StockInformation file are added to the master list of Events and Observers 822.

In step 806, the StockIndex EventModel 824 is created and added to the EventStore in step 808. In step 810, the ModelEvents from the StockIndex EventModel 824 are retrieved and loop is started for each ModelEvent at 812. If there are no more ModelEvents, the process moves to step 826. If there are ModelEvents, the process moves to step 814.

In step 814, the topic for the current model event is obtained and in step 816 a list of EventObservers that match the topic are retrieved from the Event Store (e.g., from the master event store 822). The list of observers that is obtained is added to the Observers of the Stockindex ModelEvent in step 818 and the process returns to step 812.

In step 826, the list of ModelEvents from event store 822 is retrieved and a loop is started for each of those ModelEvents at 828. If there are no more ModelEvents, the process moves to step 836. If there are more model events, the process moves to step 830.

In step 830, the topic of the current ModelEvent in the loop is obtained. In step 832, a list of event observers that match the current topic is obtained from the map data structure in the StockIndex EventModel. The retrieved list is added to the master ModelEvent of the EventStore at 822 and the process returns to step 828. In step 836, all of the ModelEvents and Observers of the StockIndex EventModel are added to the event store of 822.

In step 838, the EventModel 852 for the ClientInformation file is created and added to the EventStore. at step 840.

At step 842 the ModelEvents of EventModel 852 are obtained and a loop is started for each of those ModelEvents at step 844. If there are no more ModelEvents, the process proceeds to step 856. If there are ModelEvents, the process proceed to step 846.

In step 846, the topic of the current ModelEvent is obtained and in step 848 the list of observers for that topic in the EventStore 822 is retrieved. In step 850, the retrieved list (which may include one item or plural items) is added to the list of observers included in EventModel 852. The process returns to step 844.

In step 856, the list of ModelEvents from EventStore 822 is retrieved and a loop is started at step 858. If there are no more ModelEvents, then the process proceeds to step 854. If there are more ModelEvents, the process proceeds to step 860 and the topic of the current ModelEvent is obtained. In step 862, the list of observers of the topic is obtained from EventModel 852. In step 864, the list is added to the ModelEvent of the EventStore at 822. The process returns to step 858.

In step 854, all of the ModelEvents and Observers from the EventModel 852 are added to the EventStore at 822 and the process is completed with the three different models being merged into one EventStore.

Once the models are merged, then the triggering process can proceed as shown in FIG. 8. FIG. 8 is similar to some of the steps shown in FIG. 4 and the new steps are shown in bold.

At step 700, the event store contains a merged list of ModelEvents from the three files (e.g., the result of the process shown in FIGS. 7 and 9). At step 702, an update action that will change the basis points with an input triggers the events for the topic "basisindex." At step 704, the custom event handler is invoked. Specifically, the event handler adds the input basis points to the existing basis points and update the in-memory model. At step 706, the custom observer handler is triggered and adds the input to the existing stock price and updates it in the model of the observer. FIG. 12 shows the results of this process where 1200 is the file before the change and 1200' is the same file after the change. Files 1202 and 1204 are also updated as a result of this process and the results of such updates are shown in FIG. 12.

FIG. 13:

FIG. 13 is a block diagram of an example computing device 1300 (which may also be referred to, for example, as a "computing device," "computer system," or "computing system") according to some embodiments. In certain example embodiments, the computing device 1300 includes one or more of the following: one or more processors 1302; one or more memory devices 1304; one or more network interface devices 1306; one or more display interfaces 1308; and one or more user input adapters 1310. Additionally, in some embodiments, the computing device 1300 is connected to or includes a display device 1312. As will explained below, these elements (e.g., the processors 1302, memory devices 1304, network interface devices 1306, display interfaces 1308, user input adapters 1310, display device 1312) are hardware devices (for example, electronic circuits or combinations of circuits) that are configured to perform various different functions for the computing device 1300. In certain examples, the configuration is achieved through the use of software programs and/or processes In some embodiments, each or any of the processors 1302 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). In certain examples, the instruction set used by the processors may include an x86 or Advanced RISC Machine (ARM) based instruction set.

In some embodiments, the memory devices 1304 include random access memory (RAM), flash memory, a hard disk, a magneto-optical medium, an optical medium, cache memory, a register (e.g., that holds instructions), or other types of devices that handle the volatile or non-volatile storage of data and/or instructions. In certain examples, RAM, DRAM, SRAM, cache memory, registers, and the like are examples of volatile storage (e.g., such that the data in the memory is retained only so long as adequate power is supplied to the memory or such data is lost rapidly upon loss of power) and other types of storage are non-volatile storage (e.g., electronic or mechanical storage that does not require power for the data or information to be maintained and subsequently retrieved). As will be appreciated by those of ordinary skill in the art and in accordance with certain example embodiments described herein, when an object or the like is added, removed, or the like to a list or other collection of objects, a pointer to the objects location in memory may be added to the list or other collection. For example, an object may exist on the heap and multiple different pointers to that object may be added to various data structures (e.g., lists, collections, trees, etc. . . . ). In other words, unless otherwise provided, adding an object to a data structure (such as a list or collection) includes adding/deleting a pointer to that object to that data structure.

In some embodiments, the network interface devices 1306 include one or more circuits (such as a baseband processor and/or a wired or wireless transceiver), and implement layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may include circuitry for a transmitter and a receiver. The transmitter and receiver may share a common housing and may share some or all of the circuitry in the housing to perform both transmission and reception. In some embodiments, the transmitter and receiver of a transceiver may not share any common circuitry and/or may be in the same or separate housings.

In certain examples, the display interfaces 1308 includes one or more circuits that receive data from the processors 1302, generate (e.g., via a discrete GPU, an integrated GPU, a CPU executing graphical processing, or the like) corresponding image data based on the received data, and/or output (e.g., via a High-Definition Multimedia Interface (HDMI), a DisplayPort Interface, a Video Graphics Array (VGA) interface, a Digital Video Interface (DVI), or the like) the generated image data to the display device 1312, which displays the image data. In certain examples, the display interfaces 1308 may include a video card, a video adapter, and/or a graphics processing unit (GPU).

In certain example embodiments, each or any of the user input adapters 1310 may include one or more circuits that receive and process user input data from one or more user input devices that are included in, attached to, or otherwise in communication with the computing device 1300 via the user input adapter 1310. The user input adapters 1310 may include, for example, a PS/2 interface, a USB interface, a touchscreen controller, or the like. The user input adapters 1310 may facilitate input from user input devices that include, for example, a keyboard, mouse, trackpad, touchscreen, etc. . . . .

In certain example embodiments, the display device 1312 may be a Liquid Crystal Display (LCD) display, Light Emitting Diode (LED) display, or other type of display device. In certain examples, the display device 1312 is included in the same housing with the computing device 1300 (e.g., a tablet or even a laptop computer). The display device may be a touch screen or a non-touchscreen display. In embodiments where the display device 1312 is externally connected to the computing device 1300 (e.g., via a wire and/or via wireless communication technology), the display device 1312 is, for example, an external monitor, projector, television, display screen, etc. . . . .

In certain examples, computing device 1300 includes one, or two, or three, four, or more of each or any of the above-mentioned elements (e.g., the processors 1302, memory devices 1304, network interface devices 1306, display interfaces 1308, and user input adapters 1310). In certain examples, the computing device 1300 includes one or more of: a processing system that includes the processors 1302; a memory or storage system that includes the memory devices 1304; and a network interface system that includes the network interface devices 1306.

In certain example embodiments, a computing device is used to implement external systems 52 (e.g., the files for which in-memory models are created are stored on local storage of the computing device), example system 50, and store configuration file 54. The components of the example system 50 (as shown in FIG. 1) may be software components that are all implemented by the same computing device. In other examples, multiple different computing devices are used to implement the techniques described herein. For example, each of the components shown in FIGS. 2A-2E may be implemented on a separate computing device. In certain examples, virtual machines are used to implement one or more of the components of the Example system 50. In certain examples, the example system 50 may be performed on a cloud-based system where virtual machines execute the functionality herein. The virtual machines may then translate that functionality into the underlying hardware resources (e.g., plural computing devices used for the cloud-based system). Accordingly, even if the "machine" that is executing the processes described herein is a virtual machine, there are still underlying hardware components that perform the processing to realize the functionality and/or configuration of the processes.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer system comprising:
   a non-volatile storage system configured to store:
      at least one file that includes data elements in a structured file format, and
      at least one configuration file that includes programmatic definitions for observer and/or observable handlers;

a processing system that includes at least one hardware processor that is coupled to electronic memory, the processing system configured to:
  generate at least one in-memory model of the at least one file by loading the at least one file stored in the non-volatile storage system to the electronic memory that is coupled to the at least one hardware processor;
  create at least one list of observer objects by determining, from among the data elements of the at least one in-memory model, that at least one of the data elements, or a property thereof, is annotated as an observer;
  create at least one list of observable objects by determining, from among the data elements of the at least one in-memory model, that at least one of the data elements, or a property thereof, is annotated as observable, where each one of the observable elements shares an attribute with at least one of the observer elements;
  for each one of the created observer and observable objects, generate a handler object and link the handler object to the corresponding created observer or observable object;
  perform a determination that a data value of a first observable element of the at least one in-memory model is to be updated;
  in response to the determination, invoke a first generated handler for the first observable object and invoke a second generated handler for an observer object that shares the same attribute with the first observable object, where the first and second generated handlers cause an update to a data value in the at least one in-memory model; and
  responsive to determination of a successful update of the data value of the at least one in-memory model, persist the in-memory model that was updated to a file on the non-volatile storage medium.

2. The computer system of claim 1, wherein the at least one file includes a plurality of files, where multiple different structured file formats are used among the plurality of files and each file is associated with a corresponding in-memory model.

3. The computer system of claim 2, wherein at least one of the observable elements and at least one over the observer elements are associated with data from different files and/or different in-memory models.

4. The computer system of claim 2, wherein the multiple different structured file formats includes Extensible Markup Language (XML) and JavaScript Object Notation (JSON) file formats.

5. The computer system of claim 2, wherein the observer object that shares the same attribute with the first observable object is a plurality of observer objects that share the same attribute with the first observable object, where each one of the plurality of observer objects invokes a corresponding generated handler.

6. The computer system of claim 2, wherein the processing system is further configure to:
  maintain a master store of observable objects and observer objects;
  for each observable object that has been generated for a new in-memory model, generate a first list of observer objects from the master store of observer objects that each share the same attribute for the corresponding observable object associated with the new in-memory model;
  add the list of observer objects to the observer objects associated with the new in-memory model.

7. The computer system of claim 6, wherein the processing system is further configure to:
  for each observable object in the master store, generate a second list of observer objects associated with the new in-memory model that share the same attribute for the corresponding observable object from the master store;
  add the second list of observer objects to the master store of observer objects.

8. The computer system of claim 7, wherein the processing system is further configure to:
  add observer objects and observable objects associated with the new in-memory model to, respectively, the master store of observer objects and observable objects.

9. The computer system of claim 1, wherein determination that the at least one of the data elements is annotated as an observer or observable is based on determining that data element is annotated during the loading of the at least one file.

10. A method of handling event notifications, the method comprising:
  storing, in non-volatile storage of a computer system, at least one file that includes data elements in a structured file format;
  storing, in non-volatile storage, at least one configuration file that includes programmatic definitions for observer and/or observable handlers;
  generating, by using a hardware processor of a computer system, at least one in-memory model of the at least one file by loading the at least one file stored in the non-volatile storage system to volatile memory that is coupled to the hardware processor;
  creating at least one list of observer objects by determining, from among the data elements of the at least one in-memory model, that at least one of the data elements, or a property thereof, is annotated as an observer;
  creating at least one list of observable objects by determining, from among the data elements of the at least one in-memory model, that at least one of the data elements, or a property thereof, is annotated as observable, where each one of the observable elements shares an attribute with at least one of the observer elements;
  for each one of the created observer and observable objects, generating a handler object and linking the handler object to the corresponding created observer or observable object;
  in response to reception of an event notification regarding a change in a data value for the first observable element of the at least one in-memory model, invoking a first generated handler for the first observable object and invoking a second generated handler for an observer object that shares the same attribute with the first observable object, the invocation of the first and second generated handlers causing an update to a data value in the at least one in-memory model; and
  responsive to determination of a successful update of the data value of the at least one in-memory model, persisting the in-memory model that was updated to a file on the non-volatile storage.

11. The method of claim 10, wherein the at least one file includes a plurality of files, where multiple different structured file formats are used among the plurality of files and each file is associated with a corresponding in-memory model.

12. The method of claim 11, wherein at least one of the observable elements and at least one over the observer elements are associated with data from different files and/or different in-memory models.

13. The method of claim 11, wherein the multiple different structured file formats includes Extensible Markup Language (XML) and JavaScript Object Notation (JSON) file formats.

14. The method of claim 11, further comprising:
maintain, in the volatile memory, a master store of observable objects and observer objects
for each observable object that has been generated for a new in-memory model, generating a first list of observer objects from the master store of observer objects that each share the same attribute for the corresponding observable object associated with the new in-memory model; and
adding the list of observer objects to the observer objects for the new in-memory model.

15. The method of claim 14, further comprising:
for each observable object in the master store, generating a second list of observer objects associated with the new in-memory model that share the same attribute for the corresponding observable object from the master store; and
adding the second list of observer objects to the master store of observer objects.

16. The method of claim 15, further comprising:
adding observer objects and observable objects associated with the new in-memory model to, respectively, the master store of observer objects and observable objects.

17. A non-transitory computer readable storage medium storing instructions for use with a computer system that includes at least one hardware processor, volatile storage, and non-volatile storage, the non-volatile storage configured to store: a) at least one file that includes data elements in a structured file format, and b) at least one configuration file that includes programmatic definitions for observer and/or observable handlers, the stored instructions comprising instructions that cause the at least one hardware processor to:
generate at least one in-memory model of the at least one file by loading the at least one file stored in the non-volatile storage system to the volatile storage that is coupled to the at least one hardware processor;
create at least one list of observer objects by determining, from among the data elements of the at least one in-memory model, that at least one of the data elements, or a property thereof, is annotated as an observer;
create at least one list of observable objects by determining, from among the data elements of the at least one in-memory model, that at least one of the data elements, or a property thereof, is annotated as observable, where each one of the observable elements shares an attribute with at least one of the observer elements;
for each one of the created observer and observable objects, generate a handler object and link the handler object to the corresponding created observer or observable object;
perform a determination that a data value of a first observable element of the at least one in-memory model is to be updated;
in response to the determination, invoke a first generated handler for the first observable object and invoke a second generated handler for an observer object that shares the same attribute with the first observable object, where the first and second generated handlers cause an update to a data value in the at least one in-memory model; and
responsive to determination of a successful update of the data value of the at least one in-memory model, persist the in-memory model that was updated to a file on the non-volatile storage.

18. The non-transitory computer readable storage medium of claim 17, wherein the at least one file includes a plurality of files, where multiple different structured file formats are used among the plurality of files and each file is associated with a corresponding in-memory model.

19. The non-transitory computer readable storage medium of claim 18, wherein at least one of the observable elements and at least one over the observer elements are associated with data from different files and/or different in-memory models.

20. The non-transitory computer readable storage medium of claim 18, wherein the stored instruction comprise additional instructions that cause the at least one hardware processor to:
maintain a master store of observable objects and observer objects;
for each observable object that has been generated for a new in-memory model, generate a first list of observer objects from the master store of observer objects that each share the same attribute for the corresponding observable object associated with the new in-memory model;
add the list of observer objects to the observer objects associated with the new in-memory model.

* * * * *